United States Patent
Bao et al.

(10) Patent No.: US 11,353,543 B2
(45) Date of Patent: Jun. 7, 2022

(54) SYSTEMS AND METHODS FOR BEAM-SWEEPING FOR NEW RADIO POSITIONING

(71) Applicant: QUALCOMM Incorporated, San Diego, CA (US)

(72) Inventors: Jingchao Bao, San Diego, CA (US); Sony Akkarakaran, Poway, CA (US); Alexandros Manolakos, Escondido, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/325,071

(22) Filed: May 19, 2021

(65) Prior Publication Data

US 2021/0373118 A1    Dec. 2, 2021

Related U.S. Application Data

(60) Provisional application No. 63/032,446, filed on May 29, 2020.

(51) Int. Cl.
*G01S 5/10* (2006.01)
*H04L 5/00* (2006.01)
(Continued)

(52) U.S. Cl.
CPC .............. *G01S 5/10* (2013.01); *H04B 7/0617* (2013.01); *H04B 7/0695* (2013.01);
(Continued)

(58) Field of Classification Search
CPC .... G01S 5/10; G01S 2205/008; G01S 1/0428; G01S 5/0018; G01S 5/0218;
(Continued)

(56) References Cited

U.S. PATENT DOCUMENTS

2019/0044677 A1    2/2019   Ly
2019/0319362 A1*  10/2019   Johnson .................. H01Q 3/30
(Continued)

OTHER PUBLICATIONS

Interdigital Communications: "Performance Evaluation for Hierarchical Initial Access Design". 3GPP DRAFT, R1-1612631, 3GPP TSG RAN WG1 Meeting #87, Performance Evaluation For Hierarchical Initial Access Design, 3rd Generation Partnership Project (3GPP), Mobile Competence Centre, 650, Route Des Lucioles, F-06921 Sophia-Ant, vol. RAN WG1, No. Reno, USA, Nov. 14, 2016-Nov. 18, 2016, Nov. 13, 2016 (Nov. 13, 2016), XP051176576, 10 Pages, Retrieved from the Internet: URL:http://www.3gpp.org/ftp/Meetings_3GPP_SYNC/RAN1/Docs/ [retrieved on Nov. 13, 2016] Section 2, p. 1-p. 2, figure 1.
(Continued)

*Primary Examiner* — Kabir A Timory
(74) *Attorney, Agent, or Firm* — Weaver Austin Villeneuve & Sampson LLP

(57) ABSTRACT

A method comprises: selecting, from a first number of first receive (RX) beams having a first beam width, a first RX beam to form a first beam-pair with a first transmit (TX) beam from one or more base stations, the selection being based on a first measurement of a first reference signal received by the UE using the first beam-pair; selecting, from a second number of second RX beams having a second beam width, a second RX beam to form a second beam-pair with the first TX beam, the selection being based on a second measurement of a second reference signal received by the UE using the second beam-pair, the second number of second RX beams being smaller than the first number of first RX beams, the second beam width being narrower than the first beam width; and performing a location estimate operation using either the second beam-pair, or a third beam-pair derived from the second beam-pair.

37 Claims, 18 Drawing Sheets

(51) Int. Cl.
  *H04B 7/08* (2006.01)
  *H04B 7/06* (2006.01)
  *H04L 1/00* (2006.01)
(52) U.S. Cl.
  CPC ......... *H04B 7/0802* (2013.01); *H04L 1/0003* (2013.01); *H04L 1/0009* (2013.01); *H04L 5/0048* (2013.01)
(58) Field of Classification Search
  CPC ... G01S 5/0236; H04B 7/0617; H04B 7/0695; H04B 7/0802; H04B 7/088; H04L 1/0003; H04L 1/0009; H04L 5/0048; H04L 5/001; H04L 5/0007; H04L 5/0023; H04L 5/0058; H04L 5/0053
  See application file for complete search history.

(56) References Cited

U.S. PATENT DOCUMENTS

2020/0128436 A1\* 4/2020 Chae ................ H04W 28/0289
2020/0145977 A1   5/2020 Kumar et al.

OTHER PUBLICATIONS

International Search Report and Written Opinion—PCT/US2021/033406—ISA/EPO—dated Aug. 31, 2021.

\* cited by examiner

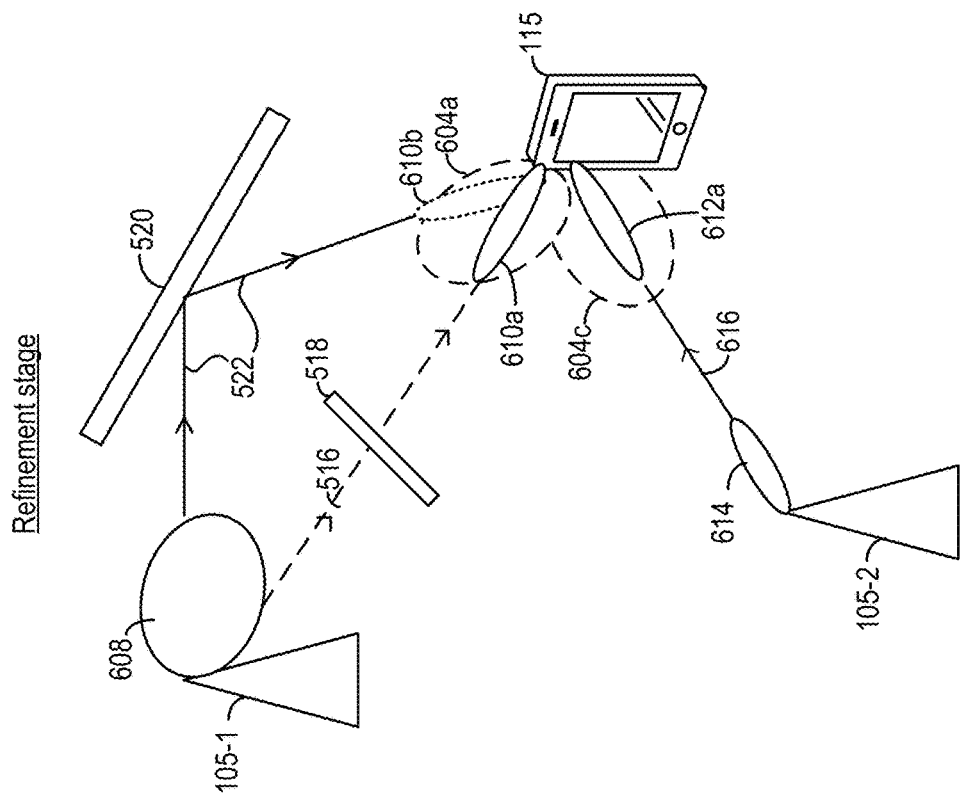
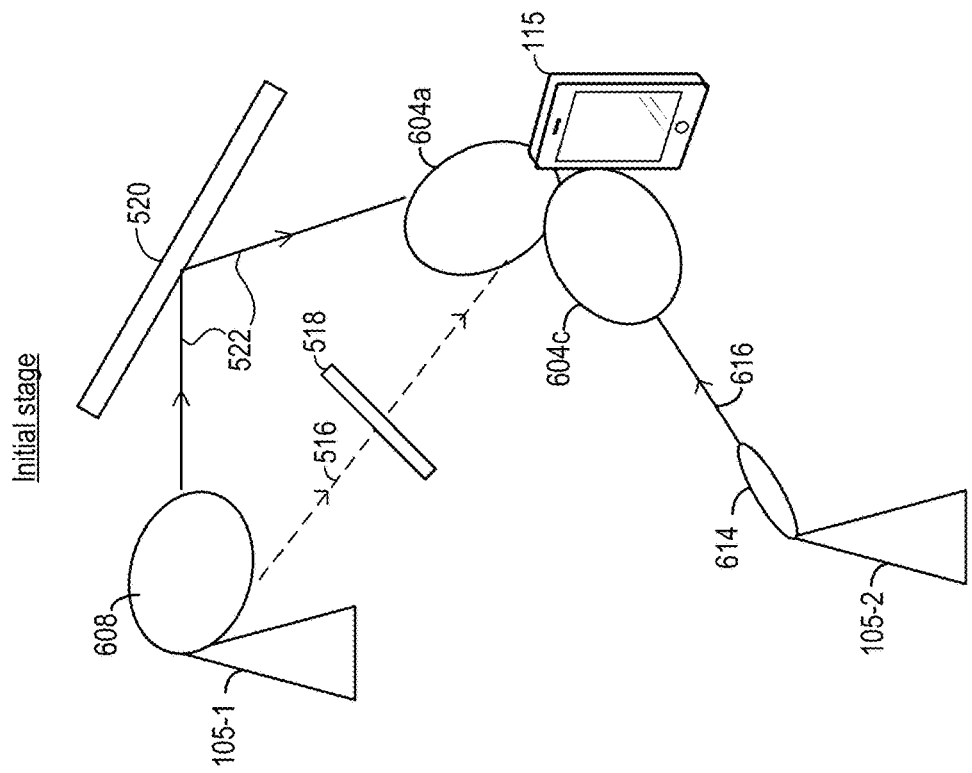
FIG. 6B

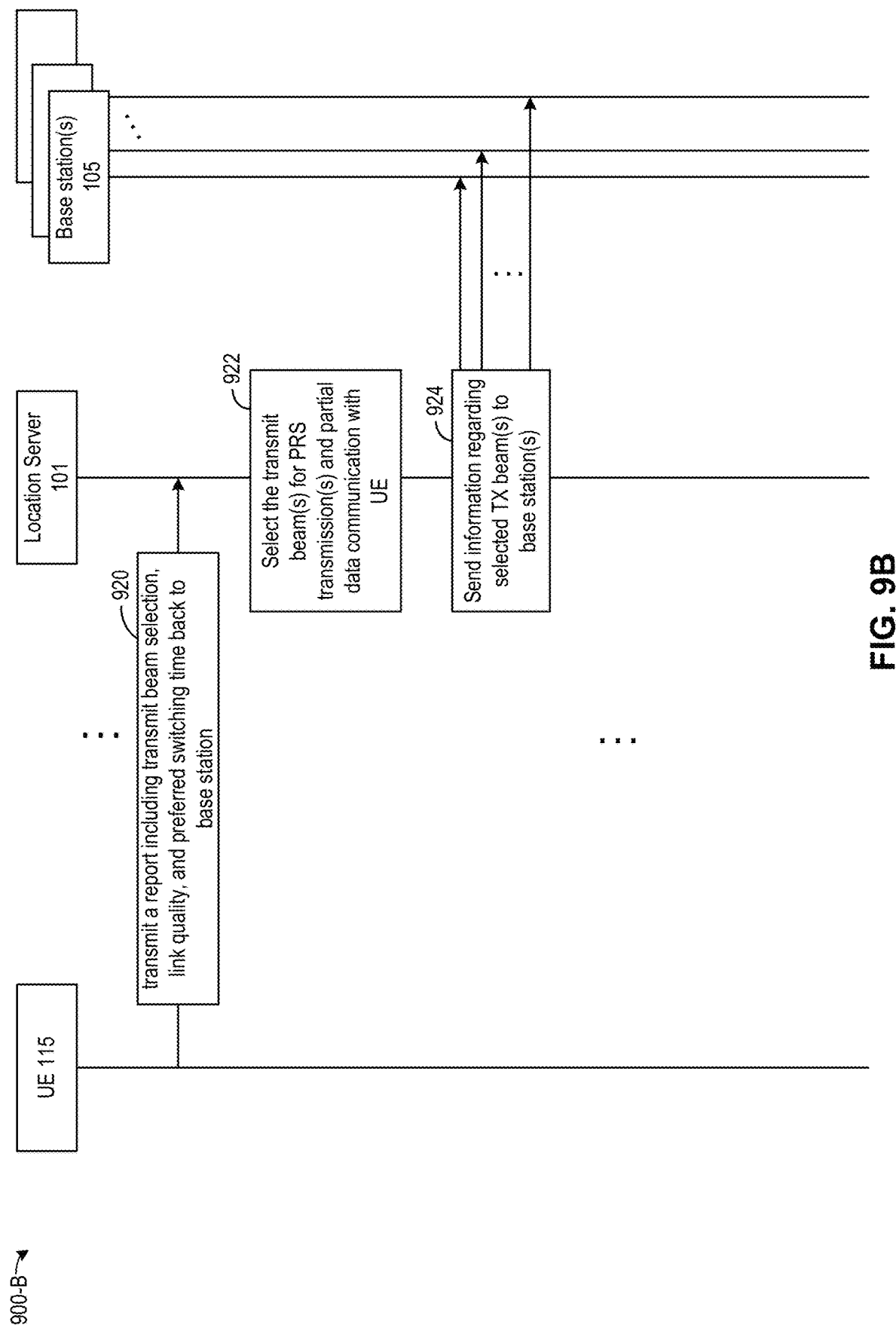

1000 ⇨

```
┌─────────────────────────────────────────────────────────────────────────┐
│ Selecting, from a first number of first receive (RX) beams having a     │
│ first beam width, a first one of the first number of RX beams to form   │
│ a first beam-pair with a first transmit (TX) beam from a base station,  │──1002
│ the selection being based on a first measurement of a first reference   │
│ signal received by the UE using the first beam-pair, wherein the first  │
│ measurement is performed based on a first subset of orthogonal          │
│ frequency division multiplexing (OFDM) symbols with which the first     │
│ reference signal is received by the UE                                  │
└─────────────────────────────────────────────────────────────────────────┘
                                    │
                                    ▼
┌─────────────────────────────────────────────────────────────────────────┐
│ Selecting, from a second number of second RX beams having a second      │
│ beam width, a first one of the second number of RX beams to form a      │
│ second beam-pair with the first TX beam, the selection being based on   │──1004
│ a second measurement of a second reference signal received by the UE    │
│ using the second beam-pair, the second number of second RX beams        │
│ being smaller than the first number of first RX beams, and the second   │
│ beam width being narrower than the first beam width                     │
└─────────────────────────────────────────────────────────────────────────┘
                                    │
                                    ▼
┌─────────────────────────────────────────────────────────────────────────┐
│ Performing a location estimate operation of the UE based on: the first  │
│ reference signal and the second reference signal, the second beam-pair, │──1006
│ a third reference signal received by the UE using either the second     │
│ beam-pair, or a third beam-pair derived from the second beam-pair, or   │
│ a combination thereof                                                   │
└─────────────────────────────────────────────────────────────────────────┘
```

FIG. 10

SYSTEMS AND METHODS FOR BEAM-SWEEPING FOR NEW RADIO POSITIONING

RELATED APPLICATIONS

This application claims the benefit of U.S. Provisional Application No. 63/032,446, filed May 29, 2020, entitled "SYSTEMS AND METHODS FOR BEAM-SWEEPING FOR NEW RADIO POSITIONING", which is assigned to the assignee hereof, and incorporated herein in its entirety by reference.

TECHNICAL FIELD

The following relates generally to wireless communications, and more specifically to techniques for supporting location services for user equipments (UEs) served by a Fifth Generation (5G) wireless network new radio (NR).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may determine a position or location of a supported UE using radio access network information. The information may be associated with UE-assisted positioning techniques, such as a reference signal transmission, by the base station and reporting of radio signaling measurements by the UE. These methods may support various location services (for example, navigation systems, emergency communications), and supplement one or more additional location systems supported by wireless communications devices (such as global positioning system (GPS) technology). As data traffic increases, however, other reporting of radio signaling measurements fail to provide robust signaling and communication within some environments, including in NR systems.

SUMMARY

This disclosure provides methods, devices, and systems for performing a location estimate operation in new radio (NR) wireless communications systems.

An example method for wireless communication at a user equipment (UE), according to this disclosure, comprises selecting, from a first number of first receive (RX) beams having a first beam width, a first one of the first number of first RX beams to form a first beam-pair with a first transmit (TX) beam from a base station, the selection being based on a first measurement of a first reference signal received by the UE using the first beam-pair, wherein the first measurement is performed based on a first subset of orthogonal frequency division multiplexing (OFDM) symbols with which the first reference signal is received by the UE. The method further comprises selecting, from a second number of second RX beams having a second beam width, a first one of the second number of second RX beams to form a second beam-pair with the first TX beam, the selection being based on a second measurement of a second reference signal received by the UE using the second beam-pair, the second number of second RX beams being smaller than the first number of first RX beams, and the second beam width being narrower than the first beam width. The method also comprises performing a location estimate operation of the UE based on: the first reference signal and the second reference signal, the second beam-pair, a third reference signal received by the UE using either the second beam-pair, or a third beam-pair derived from the second beam-pair, or a combination thereof.

An example user equipment (UE), according to this disclosure, comprises a transceiver, a memory, and one or more processors communicatively coupled with the transceiver and the memory, wherein the one or more processors are configured to select, from a first number of first receive (RX) beams having a first beam width, a first one of the first number of first RX beams to form a first beam-pair with a first transmit (TX) beam from a base station, the selection being based on a first measurement of a first reference signal received by the UE using the first beam-pair, wherein the first measurement is performed based on a first subset of orthogonal frequency division multiplexing (OFDM) symbols with which the first reference signal is received by the UE. The one or more processing units are further configured to select, from a second number of second RX beams having a second beam width, a first one of the second number of second RX beams to form a second beam-pair with the first TX beam, the selection being based on a second measurement of a second reference signal received by the UE using the second beam-pair, the second number of second RX beams being smaller than the first number of first RX beams, and the second beam width being narrower than the first beam width. The one or more processing units are further configured to perform a location estimate operation of the UE based on: the first reference signal and the second reference signal, the second beam-pair, a third reference signal received by the UE using either the second beam-pair, or a third beam-pair derived from the second beam-pair, or a combination thereof.

An example apparatus for wireless communication at a user equipment (UE), according to this disclosure, comprises means for selecting, from a first number of first receive (RX) beams having a first beam width, a first one of the first number of first RX beams to form a first beam-pair with a first transmit (TX) beam from a base station, the selection being based on a first measurement of a first reference signal received by the UE using the first beam-pair, wherein the first measurement is performed based on a first subset of orthogonal frequency division multiplexing (OFDM) symbols with which the first reference signal is received by the UE. The apparatus further comprises means for selecting, from a second number of second RX beams having a second beam width, a first one of the second number of second RX beams to form a second beam-pair with the first TX beam, the selection being based on a second measurement of a second reference signal received by the UE using the second beam-pair, the second number of second RX beams being smaller than the first number of first RX beams, and the second beam width being narrower than the first beam width. The apparatus further comprises means for performing a location estimate operation of the UE based on: the first reference signal and the second reference signal, the second beam-pair, a third reference signal received by the UE using either the second beam-pair, or a third beam-pair derived from the second beam-pair, or a combination thereof.

According to this disclosure, an example non-transitory computer-readable medium stores instructions for wireless communication at a user equipment (UE), the instructions comprising code for selecting, from a first number of first receive (RX) beams having a first beam width, a first one of the first number of first RX beams to form a first beam-pair with a first transmit (TX) beam from a base station, the selection being based on a first measurement of a first reference signal received by the UE using the first beam-pair, wherein the first measurement is performed based on a first subset of orthogonal frequency division multiplexing (OFDM) symbols with which the first reference signal is received by the UE. The instructions further comprise code for selecting, from a second number of second RX beams having a second beam width, a first one of the second number of second RX beams to form a second beam-pair with the first TX beam, the selection being based on a second measurement of a second reference signal received by the UE using the second beam-pair, the second number of second RX beams being smaller than the first number of first RX beams, and the second beam width being narrower than the first beam width. The instructions further comprise code for performing a location estimate operation of the UE based on: the first reference signal and the second reference signal, the second beam-pair, a third reference signal received by the UE using either the second beam-pair, or a third beam-pair derived from the second beam-pair, or a combination thereof.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 6A and FIG. 6B are diagrams illustrating exemplary techniques for multi-stage beam-sweeping operations in accordance with aspects of the present disclosure.

FIGS. 9A-9B are diagrams illustrating examples of multi-stage beam sweeping operations in a data communication session prior to a PRS positioning occasion in accordance with aspects of the present disclosure.

FIG. 10 shows a process flow illustrating a method of performing multi-stage beam sweeping operations in accordance with aspects of the present disclosure.

DETAILED DESCRIPTION

Figure 1A:
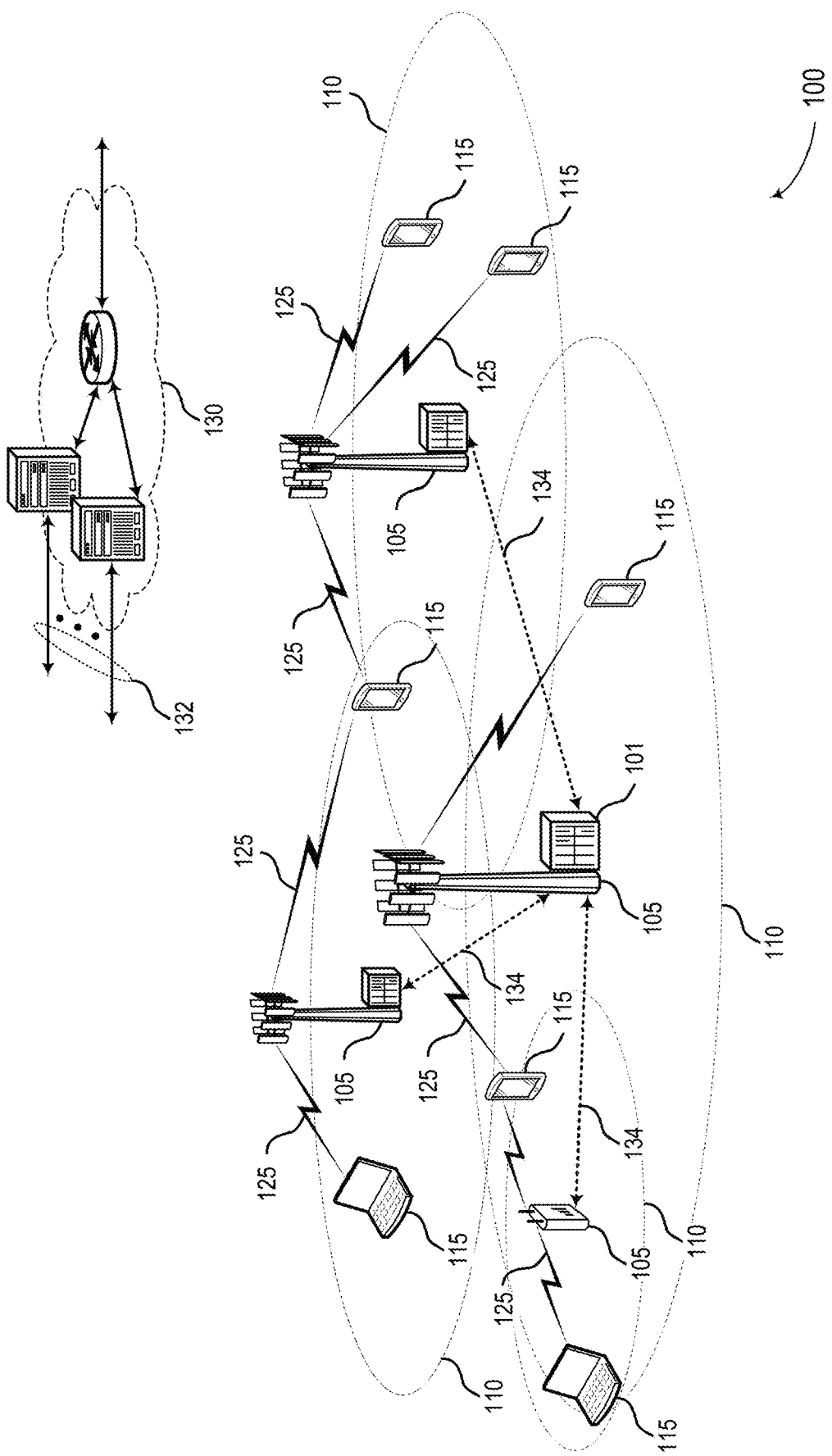
FIG. 1A, FIG. 1B, and FIG. 1C illustrate examples of a wireless communications system that supports beam group reporting for positioning in new radio (NR) systems in accordance with aspects of the present disclosure.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

In location determination, such as Observed Time Difference of Arrival (OTDOA) based positioning, the UE may measure time differences in received signals from a plurality of base stations. Because positions of the base stations are known, the observed time differences may be used to calculate the location of the terminal. In OTDOA, the mobile station measures the Time Of Arrival (ToA) of signals from a reference cell (e.g., the serving cell) and one or more neighboring cells. The ToA from the reference cell may be subtracted from the ToA from the one or more reference cells to determine the Reference Signal Time Difference (RSTD). Using the RSTD measurements, the absolute or relative transmission timing of each cell, and the known position(s) of the physical transmitting antennas for the reference and neighboring cells, the UE's position may be calculated.

Positioning Reference Signals (PRS) are reference signals that may be transmitted by base stations and are used by UEs for positioning in wireless networks, such as a Long Term Evolution (LTE) network, and 5G NR networks. According to some positioning techniques, a UE can measure a ToA of the PRS transmissions from different base stations and report measurements to the network/server. A PRS transmission may include a plurality of PRS resources in a PRS resource set, where each PRS resource is associated with a beam transmitted by the base station. (PRS resources and resource sets are described in more detail below, with regard to FIGS. 2A and 2B.) The UE may choose to use a subset of the PRS resource set as a reference PRS resource or a neighbor (target) resource, where the subset may be more than one PRS resource. For example, the UE may choose to use a subset of PRS resources from a reference base station to produce a reference ToA for the RSTD measurement, e.g., the subset of PRS resources are used to produce a combined ToA for the reference base station. Similarly, the UE may choose to a subset of PRS resources from a neighbor (target) base station to produce a neighbor ToA for the RSTD measurement, e.g., the subset of PRS resources are used to produce a combined ToA for the neighbor base station.

FIG. 1A illustrates an example of a wireless communications system 100 in accordance with one or more aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (for example, mission critical) communications, low latency communications, or communications with low-cost and low-complexity devices.

As used herein, a "network node" may be a base station (e.g., a base station 105), a cell of a base station (e.g., a cell of a base station 105), a remote radio head, an antenna of a base station (e.g., an antenna of a base station 105, where the locations of the antennas of a base station are distinct from the location of the base station itself), an array of antennas of a base station (e.g., an array of antennas of a base station 105, where the locations of the antenna arrays are distinct from the location of the base station itself), or any other network entity capable of transmitting reference RF signals. Further, as used herein, a "network node" may refer to either a network node or a UE.

The term "base station" may refer to a single physical transmission point or to multiple physical transmission points that may or may not be co-located. For example, where the term "base station" refers to a single physical transmission point, the physical transmission point may be an antenna of the base station (e.g., a base station 105) corresponding to a cell of the base station. Where the term "base station" refers to multiple co-located physical transmission points, the physical transmission points may be an array of antennas (e.g., as in a Multiple Input-Multiple Output (MIMO) system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 115) and a neighbor base station whose reference RF signals the UE 115 is measuring.

The term "cell" refers to a logical communication entity used for communication with a base station (e.g., over a carrier), and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

An "RF signal" comprises an electromagnetic wave that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

The term "position estimate" is used herein to refer to an estimate of a position for a UE 115, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

A cell may refer to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some examples, UEs 115 may be designed to support critical functions (for example, mission critical functions), and a wireless communications system 100 may be configured to provide ultra-reliable communications for these functions.

In some examples, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (for example synchronization signals (SS), reference signals, beam selection signals, or other control signals) may be transmitted by a base station 105 multiple times in different beams of different directions, in a transmit-side beam-sweeping operation. Examples of the synchronization signals include primary synchronization signal (PSS), secondary synchronization signal (SSS), physical broadcast channel (PBCH) signal, etc. The different beams can be transmitted according to different beamforming weight sets associated with different directions of transmission. Transmissions in different beam directions may be used to identify (for example, by the base station 105 or a receiving device, such as a UE 115) a beam direction for subsequent transmission or reception by the base station 105.

Figure 1B:
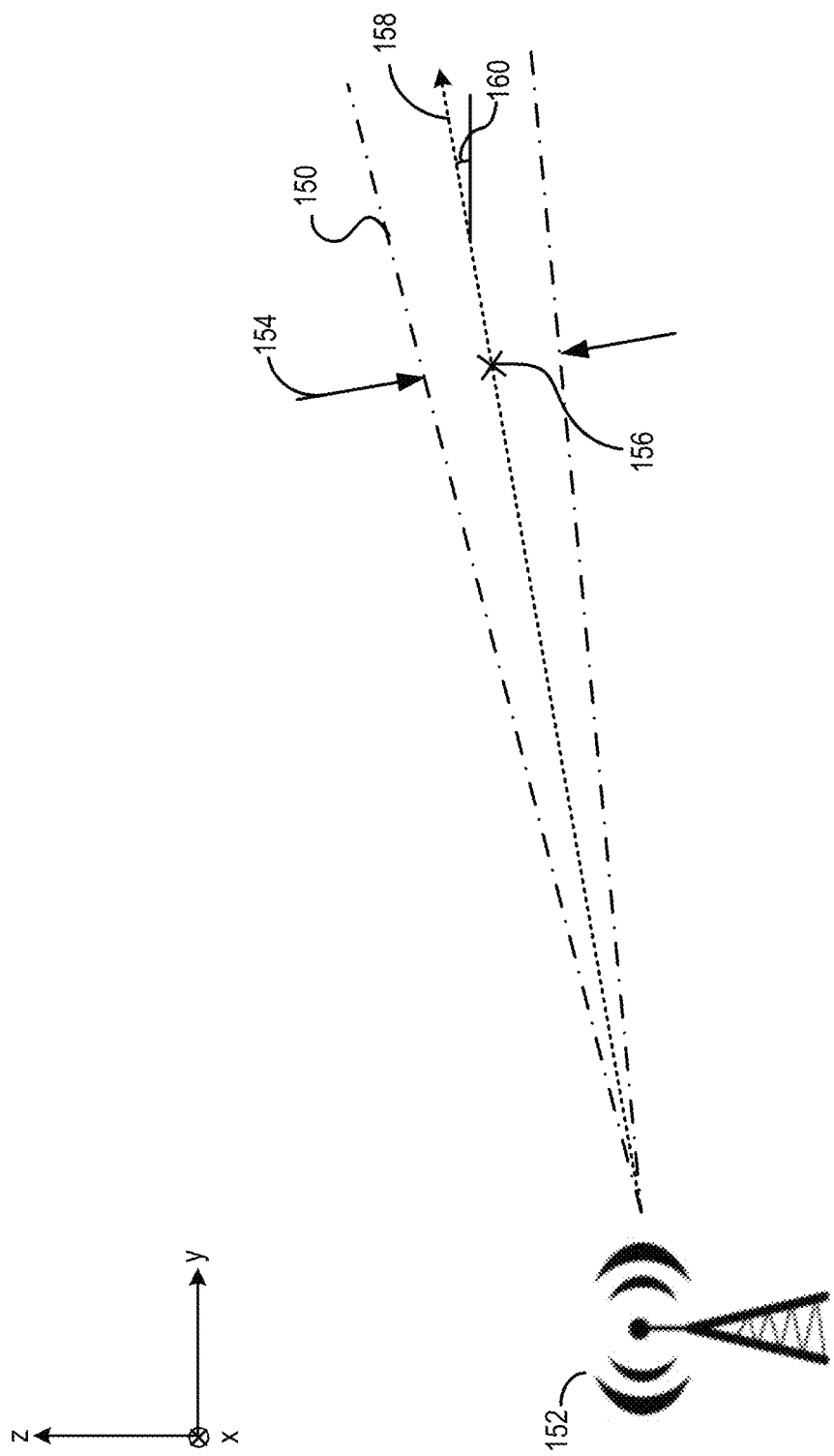

FIG. 1B is an example of a radio beam (herein after, "beam") 150 that can be transmitted by base station 105 using a beamforming operation. Beam 150 may be generated by an antenna 152. Beam 150 may be generated by antenna 152 based on an antenna pattern which defines a pattern of radiation of energy (by antenna 152) as a function of space. The pattern of radiation can be defined based on a beam width (e.g., beam width 154) and a corresponding beam center (e.g., beam center 156) along a propagation path (e.g., propagation path 158) of the beam. Propagation path 158 can be associated with an angle of departure (AOD) from antenna 152 and with respect to a reference plane and/or axis, which defines a transmission direction of beam 150. In the example of FIG. 1B, propagation path 158 may be associated with an AOD 160 with respect to an Y-axis (e.g. a horizontal Y-axis). The beam width may define a distance (from a corresponding beam center) where the power level of the beam drops by a predetermined percentage (e.g., 50% or 3 dB) compared with the power level at the corresponding beam center. In some examples, antenna 152 may include a number of antenna elements each of which can transmit radio signals, and antenna 152 can set an angle of departure of a beam by setting phase differences of transmissions by each antenna element. The phase differences can lead to constructive (or destructive) interferences among the transmitted radio signals, to form a beam along a predetermined propagation path based on the pre-set angle of departure.

Some signals, such as data signals associated with a communication operation with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, in a receive-side beam-sweeping operation, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. Each receive beam can correspond to a configuration of the antenna array that defines a receive direction and a beam width centered around the direction, as shown in FIG. 1B, of a detection region. An incoming beam that comes into the detection region can then be detected by the antenna array. The received beam signal strength may vary based on the alignment between the beam direction of the incoming beam and the receive direction of the receive beam. In some examples a receiving device may use a single receive beam to receive along a single beam direction (for example, when receiving a data signal). The single receive beam may be aligned in a beam direction determined based on listening according to different receive beam directions (for example, a beam direction determined to have a highest signal strength, highest signal-to-noise ratio, or otherwise acceptable signal quality based on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

Figure 1C:
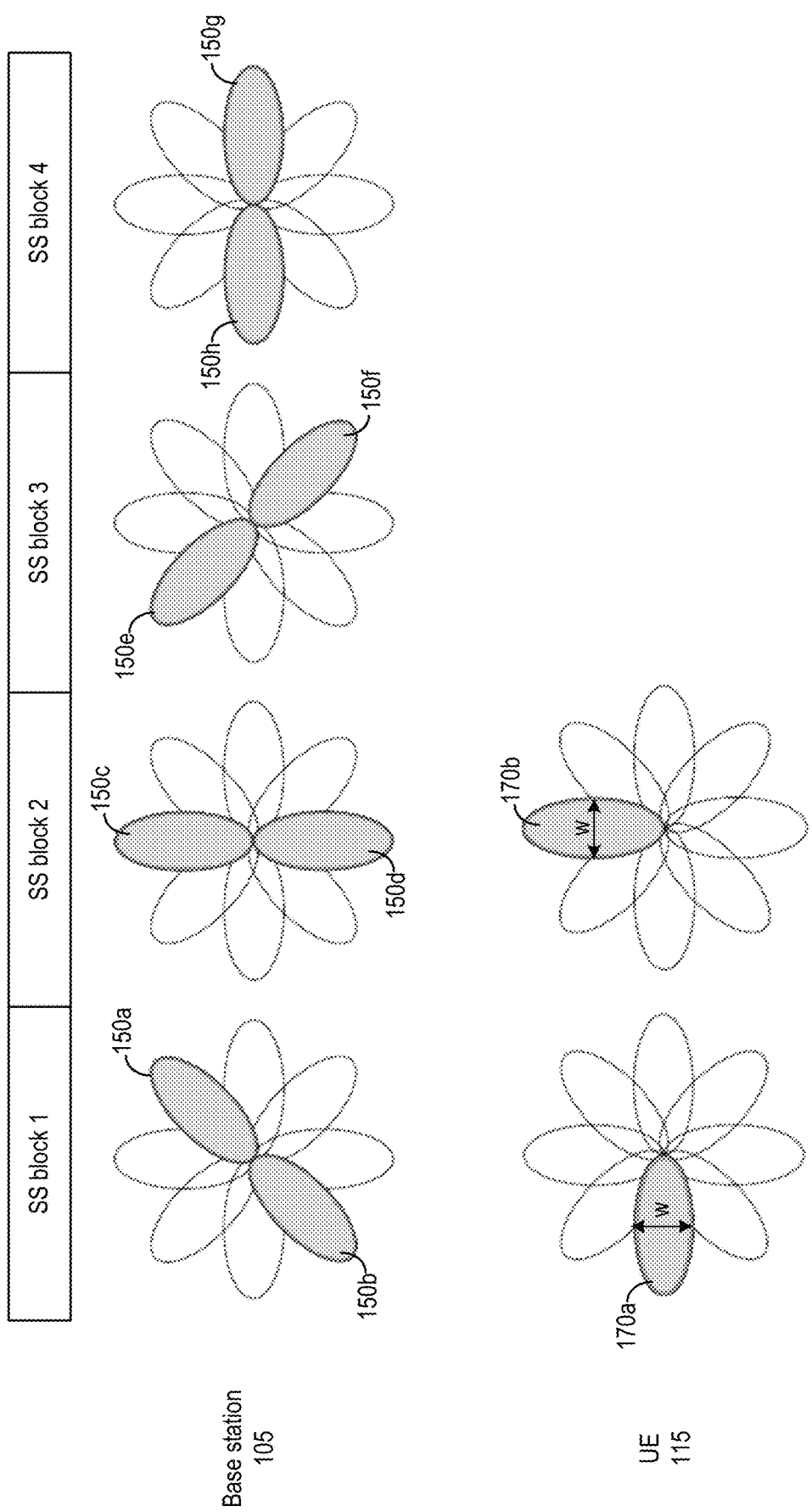

FIG. 1C illustrates an example of transmit-side and receive-side beam-sweeping operations between base station 105 and UE 115 to identify beams for downlink and uplink transmission of communication data. As shown in FIG. 1C, as part of the transmit-side beam-sweeping operation, base station 105 can transmit, sequentially, one or more beams at targeted at different directions to transmit downlink (DL) synchronization signal (SS) blocks. The beams can be transmitted in an SS burst. In an SS burst, base station 105 can transmit multiple beams 150 ("transmit beam" or "TX beam") carrying multiple SS blocks. Each SS block can contain four symbols with PSS, SSS, and PBCH. Each SS block is transmitted by one transmit beam, and different beams can be transmitted to carry different SS blocks. For example, base station 105 can sequentially transmit beams 150a and 150b for DL SS block 1, and then beams 150c and 150d for DL SS block 2, and then beams 150e and 150f for DL SS block 3, followed by beams 150g and 150h for DL SS block 4. As the synchronization signals are broadcast signals, UE 115 can performing beam-sweeping operation with transmit beams carrying SS, even if base station 105 is a non-serving cell for UE 115.

Moreover, as part of the receive-side beam sweeping operation, UE 115 can perform for a search of a receive beam ("RX beam") that aligns with the propagation direction of one of the transmit beams from base station 105, and multiple receive beams can align with multiple propagation directions depending on the relative locations between UE 115 and base station 105. For example, receive beam 170a can align with transmit beam 150g if, for example, UE 115 is at a first location with respect to base station 105, whereas receive beam 170b can align with transmit beam 150d when UE 115 is at a second location with respect to base station 105. Each receive beam can correspond to, for example, a configuration of the antenna array to set a direction and a beam width of a radio beam to be detected by the antenna array at a particular time. The search can be performed sequentially over a number of beam directions and based on, for example, identifying a pair of transmit radio beam and receive radio beam (a beam-pair) through which the signal strength of the SS block, transmitted by the transmit beam of the beam-pair and received using receive beam configuration of the beam-pair, is the highest. After identifying the beam-pair, UE 115 can transmit a report identifying the transmit radio beam of the beam-pair to base station 105. The report can be sent via, for example, Uplink Control Information (UCI), MAC Control Element (MAC-CE), Radio Resource Control (RRC), etc. UE 115 can use a transmit beam that aligns with the receive beam to transmit the information. The information enables base station 105 to select the transmit beam of the beam-pair for the subsequent downlink communication with UE 115.

In FIG. 1C, the number of receive beam directions swept by UE 115 is set to receive transmitted signals over a predetermined spatial area surrounding UE 115. The number of receive beam directions can be based on the beam width (labelled w) of the receive beams. For example, using a receive beam configuration of a wider beam width, a smaller number of beam directions may be needed to cover the same spatial area as a different receive beam configuration of a narrower beam width. In the example of FIG. 1C, UE 115 may sweep through eight receive beam directions to search for the transmit-receive beam-pair. As the beam direction of transmit beam also changes with time (e.g., for each SS block), UE 115 may need to sweep through the receive beam directions for each transmit beam. In a case where base station 105 transmits M beams for M SS blocks, and that UE 115 sweeps through N receive beam directions, the total overhead for an exhaustive search for the beam-pair that give rise to the maximum signal strength of received SS block, within a search space of M transmit beams and N receive beams, is in the order of M×N.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling duration of $T_s=1/30,720,000$ seconds. Time intervals of a communications resource may be organized according to radio frames each having a duration of 10 milliseconds (ms), where the frame duration may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol duration may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

A carrier may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information, etc.) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a defined portion or range (for example, set of subcarriers or RBs) within a carrier (for example, "in-band" deployment of a narrowband protocol type).

In a system employing MCM techniques, a resource element may consist of one symbol duration (for example, a duration of one modulation symbol) and one subcarrier, where the symbol duration and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, 80 MHz, etc.) at reduced symbol durations (for example, 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

As described herein, wireless communications system 100 may be an NR system and support communications between the one or more base stations 105 and supported UEs 115 using communication links 125. The UEs 115 may be dispersed throughout the wireless communications system 100, and each UE 115 may be stationary or mobile. Wireless communications system 100 may minimize always-on transmission and support forward capability, including transmission of reference signals based on a need at a base station 105 or a UE 115. As part of the communication, each of the base stations 105 and UEs 115 may support reference signal transmission for operations, including channel estimation, beam management and scheduling, and wireless device positioning within the one or more coverage areas 110.

For example, the base stations 105 may transmit one or more downlink reference signals for NR communications, including channel state information reference signal (CSI-RS) transmission. Each of the CSI-RS transmissions may be configured for a specific UE 115 to estimate the channel and report channel quality information. The reported channel quality information may be used for scheduling or link adaptation at the base stations 105, or as part of a mobility or beam management procedure for directional transmission associated with the enhanced channel resources.

A base station 105 may configure a CSI-RS transmission on one or more CSI-RS resources of the channel. A CSI-RS resource may start at any OFDM symbol of a slot and occupy one or more symbols depending on a configured number of ports. For example, a CSI-RS resource may span one symbol of a slot and contain one port for transmission. The one or more CSI-RS resources may span a number of CSI-RS resource sets configured according to a CSI-RS resource setting of the base station 105. The structure of the one or more CSI-RS resources, CSI-RS resource sets, and CSI-RS resource settings within a CSI-RS transmission may be referred to as a multi-level resource setting. For example, a multi-level CSI-RS resource setting of the base station 105 may include up to 16 CSI-RS resource sets and each CSI-RS resource set may contain up to 64 CSI-RS resources. In some examples, the base station 105 may support a configured number of distinct CSI-RS resources (for example, 128) over one or more CSI-RS resource sets.

In some examples, a base station 105 may provide an indication (such as the tag "Repetition=ON") associated with a CSI-RS transmission directed to a UE 115. The indication may define whether the UE 115 may assume the included CSI-RS resources within the reference signal (for example, a non-zero power (NZP) CSI-RS transmission) are associated with the same downlink spatial domain transmission filter and correspond to a single transmit beam at the base station 105. The indication may be configured according to a higher layer signaling parameter (for example, reportQuantity) associated with all the reporting settings linked with the CSI-RS resource set. For example, the base station 105 may configure the reportQuantity parameter to a set indication (for example "cri-RSRP", "none", etc.) that indicates a single transmit beam.

At reception, the UE 115 may identify the configured set indication associated with the received higher layer signaling parameter. In some examples (such as "cri-RSRP" reporting), the UE 115 may determine CSI parameters for the one or more CSI-RS resources and report the measurements according to a refined reporting configuration. For example, the UE 115 may determine CSI parameters (for example, RSRP values) for the one or more channel resources. The UE 115 may then condition the reporting according to a configured channel resource indicator (CRI) value, as one example, where the CRI value corresponds to an index of a resource entry associated with the one or more CSI-RS resources in a corresponding CSI-RS resource set for channel measurement.

In some examples, the base stations 105 may transmit one or more additional downlink reference signals for communication, including a positioning reference signal (PRS) transmission. The PRS transmission may be configured for a specific UE 115 to measure and report one or more report parameters (for example, report quantities) associated with positioning and location information. A base station 105 may use the reported information as part of a UE-assisted positioning technique. The PRS transmission and report parameter feedback may support various location services (for example, navigation systems, emergency communications). In some examples, the report parameters supplement one or more additional location systems supported by the UE 115 (such as global positioning system (GPS) technology).

A base station 105 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 105. The structure of the one or more PRS resources, PRS resource sets, and PRS resource settings within a PRS transmission may be referred to as a multi-level resource setting. For example, multi-level PRS resource setting of the base station 105 may include multiple PRS resource sets and each PRS resource set may contain a set of PRS resources (such as a set of 4 PRS resources).

The UE 115 may receive the PRS transmission over the one or more PRS resources of the slot. The UE 115 may determine a report parameter for at least some of if not each PRS resource included in the transmission. The report parameter (which may include a report quantity) for each PRS resource may include one or more of a time of arrival (ToA), a reference signal time difference (RSTD), a reference signal receive power (RSRP), an angle, a PRS identification number, a reception to transmission difference (UE Rx–Tx), a signal-to-noise ratio (SNR), or a reference signal receive quality (RSRQ).

Wireless communications system 100 may be or include a multicarrier beamformed communication system, such as a mmW wireless communication system. Aspects of wireless communications system 100 may include use of PRS transmissions by the base station 105 or sounding reference signal (SRS) transmissions by the UE 115 for UE location determination. For downlink-based UE location determination, a location server 101, e.g., a Location Management Function (LMF) in a NR network or a Secure User Plane Location (SUPL) Location Platform (SLP) in LTE, may be used to provide positioning assistance, such as PRS assistance data (AD) to the UE 115. In UE-assisted positioning, the location server may receive measurement reports from the UE 115 that indicates position measurements for one or multiple base stations 105 with which location server may determine a position estimate for the UE 115, e.g., using OTDOA, or other desired techniques. The location server 101 is illustrated in FIG. 1 as being located at a base station 105, but may be located elsewhere, e.g., within the core network 130.

For uplink-based UE location determination, the base station 105 may receive SRS transmissions from the UE 115 and determine position measurements, such as ToA or Rx-Tx. A location server 101 may receive measurement reports from one or more base stations 105 with the position measurements and may determine a position estimate for the UE 115, e.g., using OTDOA or other desired techniques.

Additionally, RAT independent techniques may be used to estimate a position of the UE 115. For example, the communications system 100 may further utilize information from space vehicles (SVs) (not illustrated) for a Global Navigation Satellite System (GNSS) like GPS, GLONASS, Galileo or Beidou or some other local or regional Satellite Positioning System (SPS) such as IRNSS, EGNOS or WAAS. Location related measurements obtained by UE 115 may include measurements of signals received from the SVs and/or may include measurements of signals received from terrestrial transmitters fixed at known locations (e.g., such as base stations 105). The UE 115 or location server 101 to which UE 115 may send the measurements, may then obtain a location estimate for the UE 115 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured at UE 115 relative to three or more terrestrial transmitters (e.g. base stations 105) fixed at known locations or relative to four or more SVs with accurately known orbital data, or combinations thereof, based at least in part, on pilots, positioning reference signals (PRS) or other positioning related signals transmitted by the transmitters or satellites and received at the UE 115.

Figure 2A:
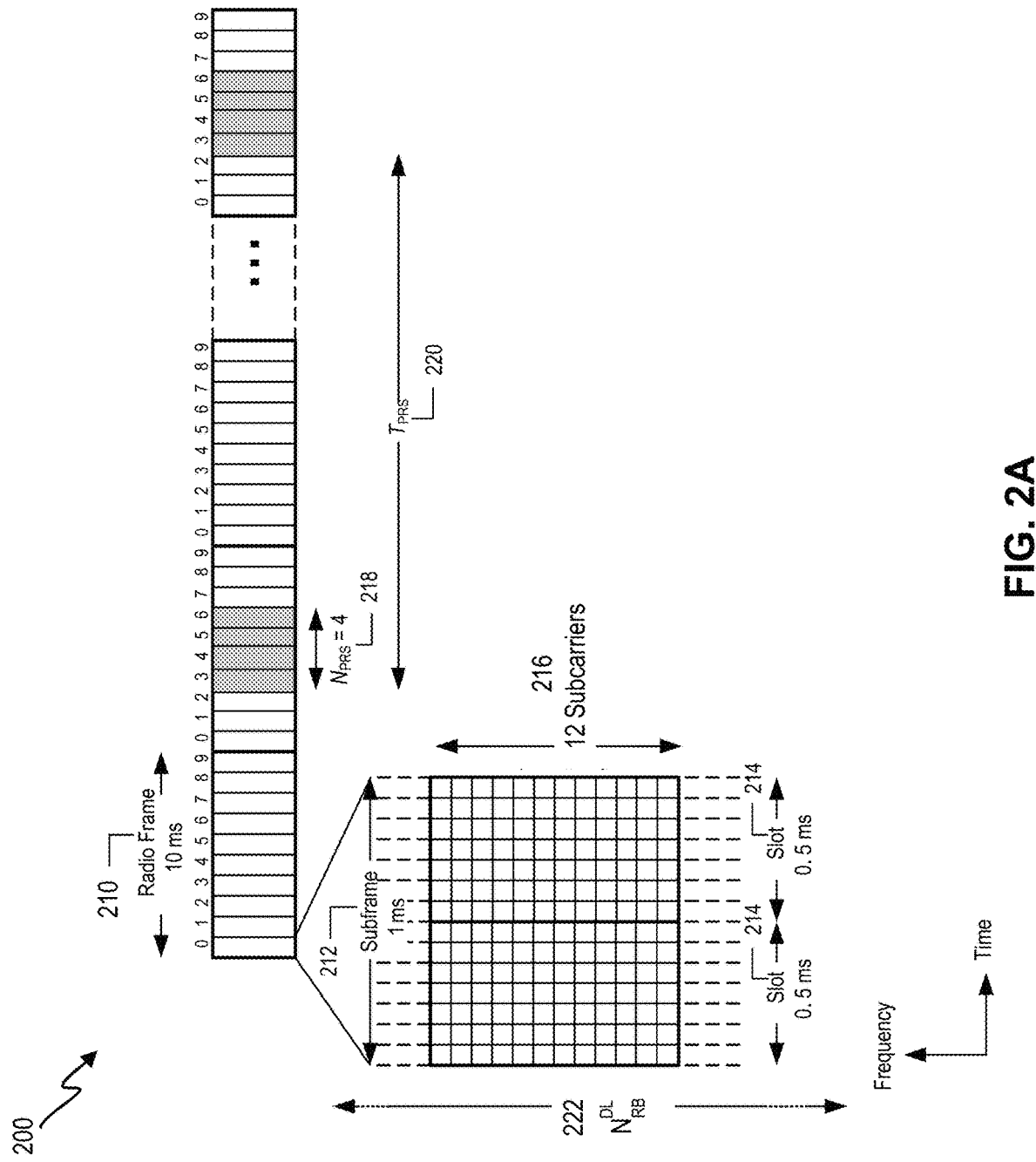
FIG. 2A and FIG. 2B are diagrams of a structure of an example LTE subframe sequence with Positioning Reference Signaling (PRS) positioning occasions.
Figure 2B:
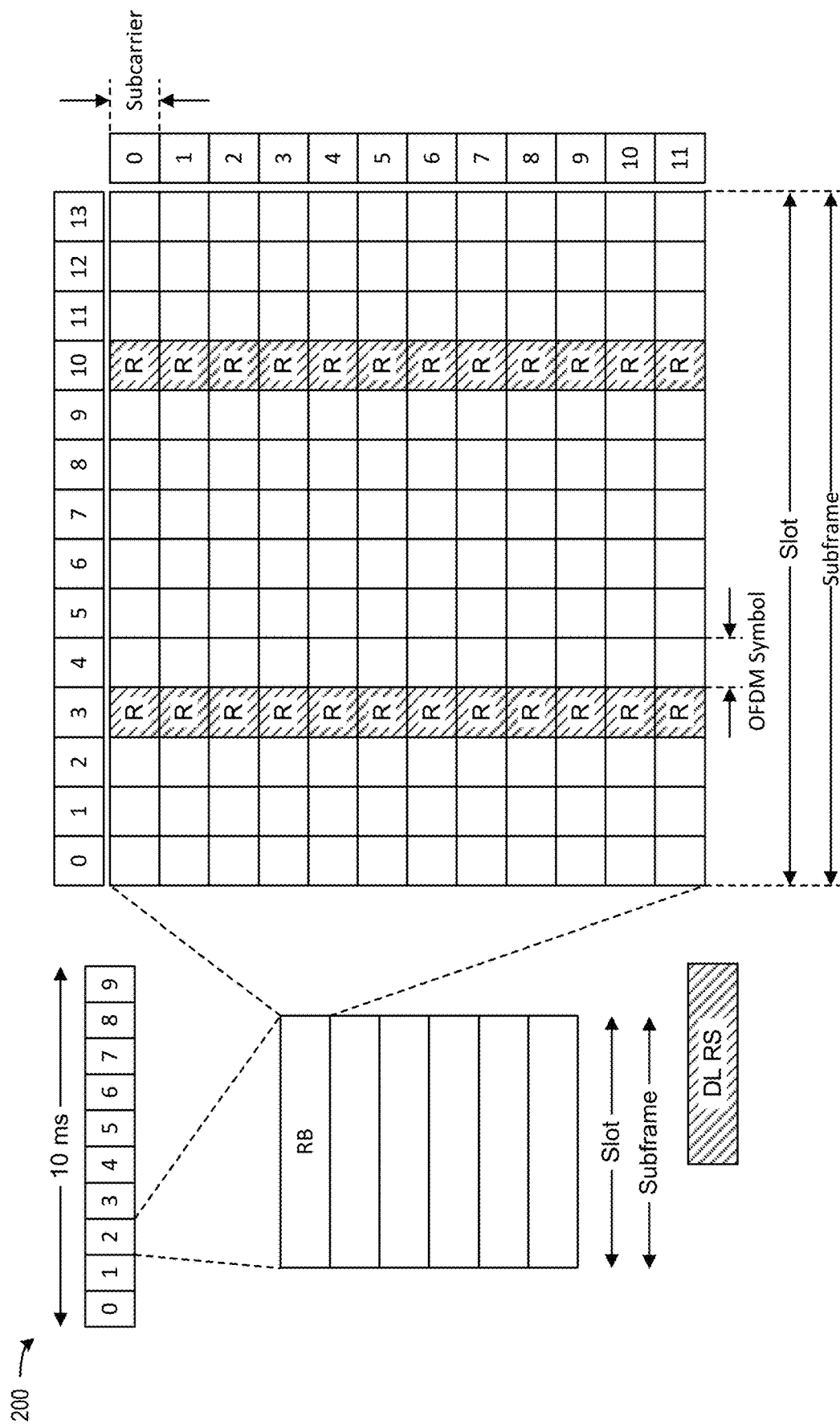

FIG. 2A and FIG. 2B shows a structure of an example subframe sequence 200 with PRS positioning occasions, which may be utilized in the wireless communications system 100 of FIG. 1, for example. A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition." Subframe sequence 200 may be applicable to broadcast of PRS signals from base stations 105 in communication systems 100. While FIG. 2 provides an example of a subframe sequence for LTE, similar subframe sequence implementations may be realized for other communication technologies/protocols, such as 5G and NR. In FIG. 2, time is represented horizontally (e.g., on an X axis) with time increasing from left to right, while frequency is represented vertically (e.g., on a Y axis) with frequency increasing (or decreasing) from bottom to top. As shown in FIG. 2, downlink and uplink Radio Frames 210 may be of 10 ms duration each. For downlink Frequency Division Duplex (FDD) mode, Radio Frames 210 are organized, in the illustrated embodiments, into ten subframes 212 of 1 ms duration each. Each subframe 212 comprises two slots 214, each of, for example, 0.5 ms duration.

In the frequency domain, the available bandwidth may be divided into uniformly spaced orthogonal subcarriers 216. For example, for a normal length cyclic prefix using, for example, 15 kHz spacing, subcarriers 216 may be grouped into a group of twelve (12) subcarriers. Each grouping, which comprises the 12 subcarriers 216, is termed a resource block and, in the example above, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$. For example, for a 3 MHz channel bandwidth in the above example, the number of available resource blocks on each channel 222 is given by $N_{RB}^{DL}=15$.

FIG. 2B illustrates additional examples of sequence 200. As shown in FIG. 2B, a resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 2, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS in LTE, NRS in 5G, TRS, PTRS, CRS, CSI-RS, DMRS, PSS, SSS, SSB, etc. FIG. 2B illustrates exemplary locations of REs carrying PRS (labeled "R"). A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fours symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL-PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set have the same periodicity, a common muting pattern configuration, and the same repetition factor across slots. The periodicity may have a length selected from $2^m$. {4, 5, 8, 10, 16, 20, 32, 40, 64, 80, 160, 320, 640, 1280, 2560, 5120, 10240} slots, with µ=0, 1, 2, 3. The repetition factor may have a length selected from {1, 2, 4, 6, 8, 16, 32} slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

In the communication system 100 illustrated in FIG. 1, a base station 105, such as macro cell base station or any of small cell base stations, may transmit frames, or other physical layer signaling sequences, supporting PRS signals (i.e. a downlink (DL) PRS) according to frame configurations either similar to, or the same as that, shown in FIG. 2A and FIG. 2B and (as described later) in FIG. 3, which may be measured and used for UE (e.g., UE 115) position determination. As noted, other types of wireless nodes and base stations (e.g., a gNB or WiFi AP) may also be configured to transmit PRS signals configured in a manner similar to (or the same as) that depicted in FIGS. 2A, 2B, and 3. Since transmission of a PRS by a wireless node or base station is directed to all UEs within radio range, a wireless node or base station can also be considered to transmit (or broadcast) a PRS.

A PRS, which has been defined in 3GPP LTE Release-9 and later releases, may be transmitted by wireless nodes (e.g., base stations 105) after appropriate configuration (e.g., by an Operations and Maintenance (O&M) server). A PRS may be transmitted in special positioning subframes that are grouped into positioning occasions. PRS occasions may be grouped into one or more PRS occasion groups. For example, in LTE, a PRS positioning occasion can comprise a number $N_{PRS}$ of consecutive positioning subframes where the number $N_{PRS}$ may be between 1 and 160 (e.g., may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 2A illustrates a periodicity of positioning occasions where $N_{PRS}$ equals 4218 and $T_{PRS}$ is greater than or equal to 20220. In some aspects, $T_{PRS}$ may be measured in terms of the number of subframes between the start of consecutive positioning occasions.

As discussed herein, in some aspects, OTDOA assistance data may be provided to a UE 115 by a location server, e.g., location server 101 for a "reference cell", sometimes referred to herein as a reference resource, and one or more "neighbor cells" or "neighboring cells", sometimes referred to herein as a target cell or target resource, relative to the "reference cell." For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to OTDOA or some other position method.

PRS-based positioning by a UE 115 may be facilitated by indicating the serving cell for the UE 115 in the OTDOA assistance data (e.g., with the reference cell indicated as being the serving cell).

In some aspects, OTDOA assistance data may also include "expected RSTD" parameters, which provide the UE 115 with information about the RSTD values the UE 115 is expected to measure at its current location between the reference cell and each neighbor cell, together with an uncertainty of the expected RSTD parameter. The expected RSTD, together with the associated uncertainty, may define a search window for the UE 115 within which the UE 115 is expected to measure the RSTD value. OTDOA assistance information may also include PRS configuration information parameters, which allow a UE 115 to determine when a PRS positioning occasion occurs on signals received from various neighbor cells relative to PRS positioning occasions for the reference cell, and to determine the PRS sequence transmitted from various cells in order to measure a signal Time of Arrival (ToA) or RSTD.

Using the RSTD measurements, the known absolute or relative transmission timing of each cell, and the known position(s) of wireless node physical transmitting antennas for the reference and neighboring cells, the UE 115's position may be calculated (e.g., by the UE 115 or by the location server 101). More particularly, the RSTD for a neighbor (sometimes referred to as a target) cell "k" relative to a reference cell "Ref," may be given as $(ToA_k - ToA_{Ref})$, where the ToA values may be measured modulo one subframe duration (1 ms) to remove the effects of measuring different subframes at different times. ToA measurements for different cells may then be converted to RSTD measurements (e.g., as defined in 3GPP TS 36.214 entitled "Physical layer; Measurements") and sent to the location server 101 by the UE 115. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE 115's position may be determined.

Figure 3:
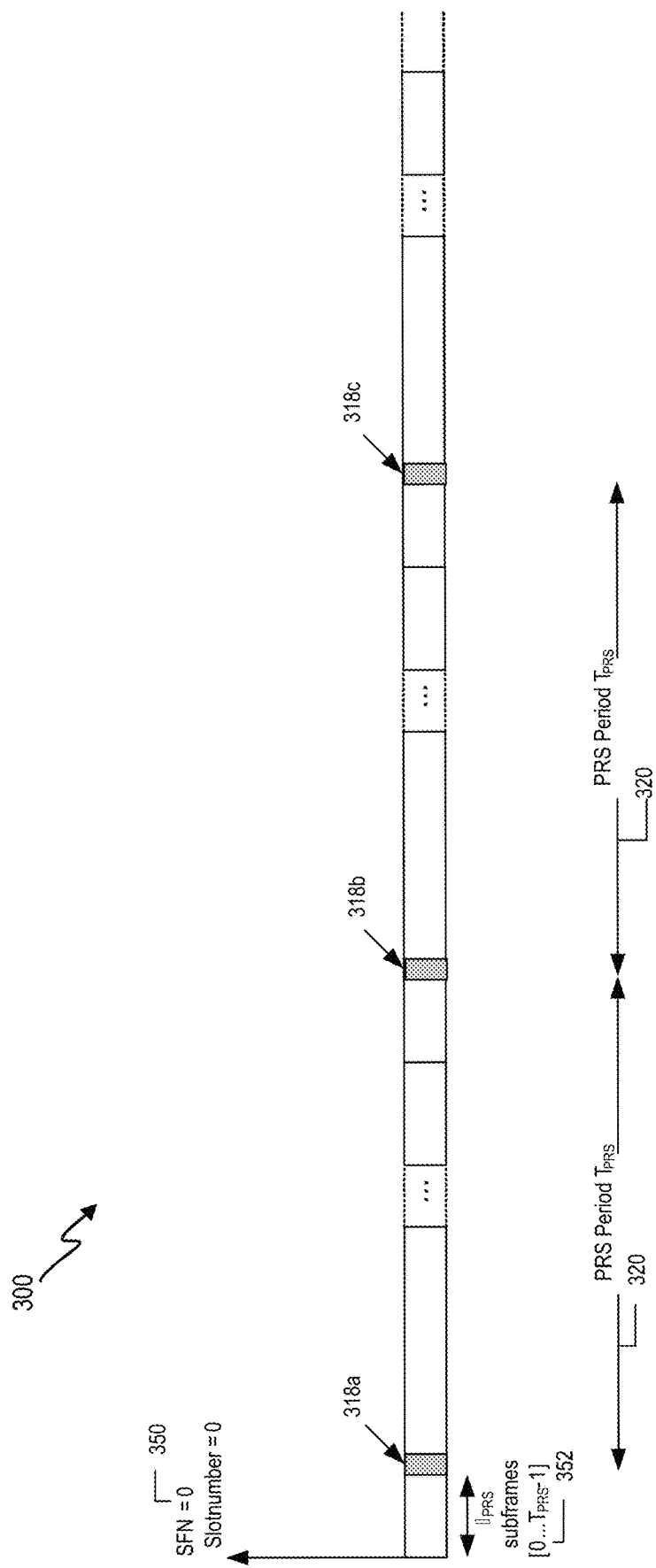
FIG. 3 and FIG. 4 are diagrams illustrating further aspects of PRS transmission for a cell supported by a wireless node.

FIG. 3 illustrates an exemplary PRS configuration 300 for a cell supported by a wireless node (such as a base station 105). Again, PRS transmission for LTE is assumed in FIG. 3, although the same or similar aspects of PRS transmission to those shown in and described for FIG. 3 may apply to 5G, NR, and/or other wireless technologies. FIG. 3 shows how PRS positioning occasions are determined by a System Frame Number (SFN), a cell specific subframe offset ($\Delta_{PRS}$) 352, and the PRS Periodicity ($T_{PRS}$) 320. Typically, the cell specific PRS subframe configuration is defined by a "PRS Configuration Index" $I_{PRS}$ included in the OTDOA assistance data. The PRS Periodicity ($T_{PRS}$) 320 and the cell specific subframe offset ($\Delta_{PRS}$) are defined based on the PRS Configuration Index $I_{PRS}$, in 3GPP TS 36.211 entitled "Physical channels and modulation," as illustrated in Table 1 below.

TABLE 1

| PRS configuration Index IPRS | PRS periodicity TPRS (subframes) | PRS subframe offset ΔPRS (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \le n_f \le 1023$, $n_s$ is the slot number within the radio frame defined by $n_f$ with $0 \le n_s \le 19$, $T_{PRS}$ is the PRS periodicity 320, and $\Delta_{PRS}$ is the cell-specific subframe offset 352.

As shown in FIG. 3, the cell specific subframe offset $\Delta_{PRS}$ 352 may be defined in terms of the number of subframes transmitted starting from System Frame Number 0 (Slot 'Number 0', marked as slot 350) to the start of the first (subsequent) PRS positioning occasion. In the example in FIG. 3, the number of consecutive positioning subframes ($N_{PRS}$) in each of the consecutive PRS positioning occasions 318a, 318b, and 318c equals 4.

In some aspects, when a UE 115 receives a PRS configuration index $I_{PRS}$ in the OTDOA assistance data for a particular cell, the UE 115 may determine the PRS periodicity $T_{PRS}$ 320 and PRS subframe offset $\Delta_{PRS}$ using Table 1. The UE 115 may then determine the radio frame, subframe and slot when a PRS is scheduled in the cell (e.g., using equation (1)). The OTDOA assistance data may be determined by, for example, the location server 101, and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset 352) relative to other cells in the network that use a different frequency. In SFN-synchronous networks all wireless nodes (e.g., base stations 105) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 115 may determine the timing of the PRS occasions of the reference and neighbor cells for OTDOA positioning, if the UE 115 can obtain the cell timing (e.g., SFN or Frame Number) of at least one of the cells, e.g., the reference cell or a serving cell. The timing of the other cells may then be derived by the UE 115 based, for example, on the assumption that PRS occasions from different cells overlap.

As defined by 3GPP (e.g., in 3GPP TS 36.211), for LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LTE Positioning Protocol (LPP) according to 3GPP TS 36.355. A directional PRS may be configured as just described according to 3GPP TSs and may, for example, use a low PRS duty cycle (e.g., $N_{PRS}=1$, $T_{PRS}=160$ subframes) or a high duty cycle.

Figure 4:
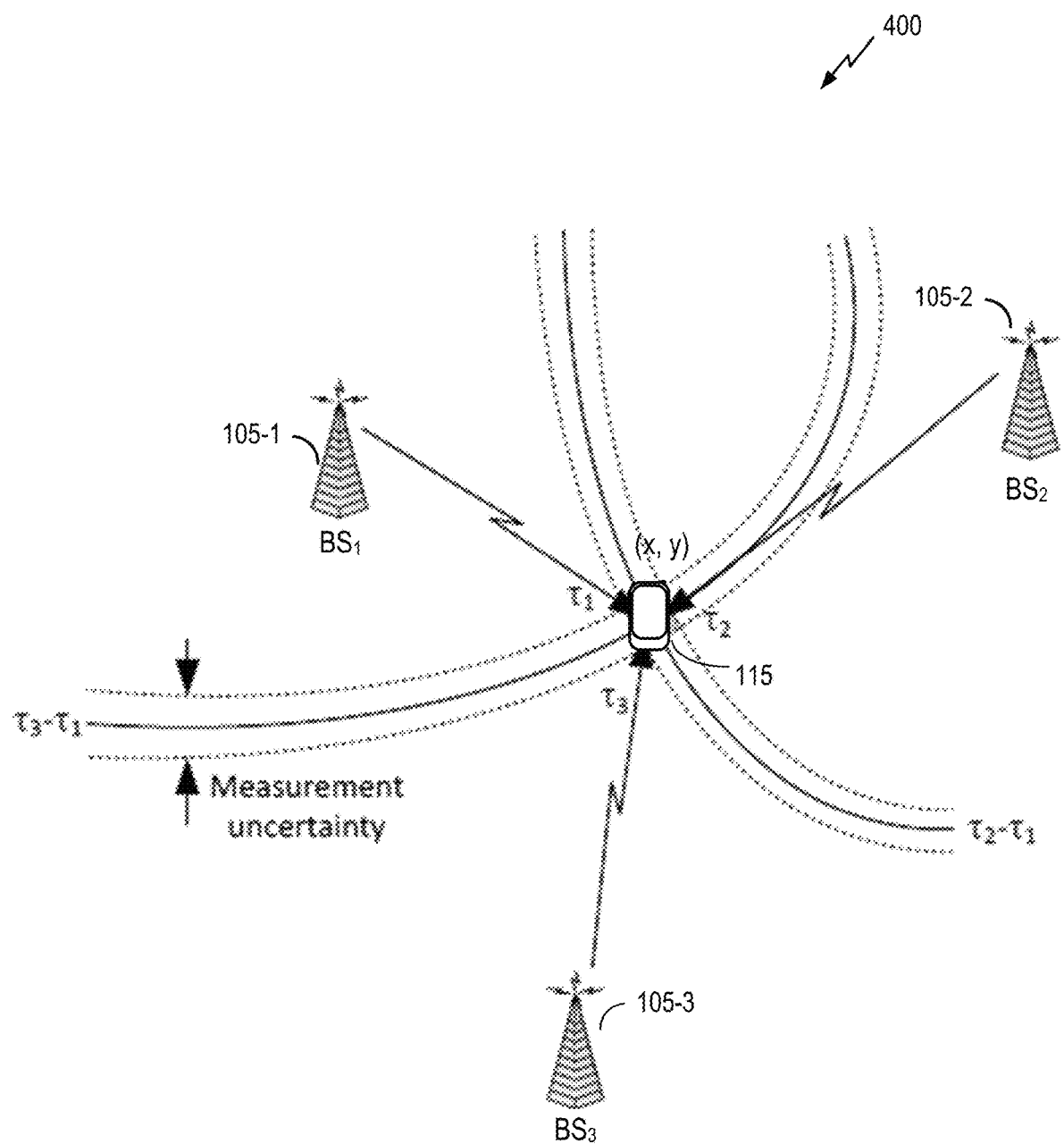

FIG. 4 illustrates a configuration 400 within a wireless communications system (e.g., the wireless communications system 100 of FIG. 1) that can be used for positioning of a UE 115, according to various aspects of the disclosure. In the example of FIG. 4, a UE 115 may calculate an estimate of its position, or assist another entity (e.g., a base station or core network component, another UE, a location server, a third party application, etc.) to calculate an estimate of its position. The UE 115 may communicate wirelessly with a plurality of base stations 105-1, 105-2, and 105-3 (collectively, base stations 105), which may correspond to any combination of base stations 105 in FIG. 1, using RF signals and standardized protocols for the modulation of the RF signals and the exchange of information packets. By extracting different types of information from the exchanged RF signals and utilizing the layout of the wireless communications system 400 (i.e., the base stations locations, geometry, etc.), the UE 115 may determine its position, or assist in the determination of its position, in a predefined reference coordinate system. In an aspect, the UE 115 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 115 and three base stations 105, as will be appreciated, there may be more UEs 115 and more or fewer base stations 105.

To support position estimates, the base stations 105 may be configured to broadcast reference RF signals (e.g., PRS, CRS, CSI-RS, synchronization signals, etc.) to UEs 115 in their coverage area to enable a UE 115 to measure characteristics of such reference RF signals. For example, the UE 115 may use the OTDOA positioning method, and the UE 115 may measure the RSTD between specific reference RF signals (e.g., PRS, CRS, CSI-RS, etc.) transmitted by different pairs of network nodes (e.g., base stations 105, antennas of base stations 105, etc.).

Generally, RSTDs are measured between a reference network node (e.g., base station 105-1 in the example of FIG. 4) and one or more neighbor network nodes (e.g., base stations 105-2 and 105-3 in the example of FIG. 4). The reference network node remains the same for all RSTDs measured by the UE 115 for any single positioning use of OTDOA and would typically correspond to the serving cell for the UE 115 or another nearby cell with good signal strength at the UE 115. In an aspect, where a measured network node is a cell supported by a base station, the neighbor network nodes would normally be cells supported by base stations different from the base station for the reference cell and may have good or poor signal strength at the UE 115. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 101) may provide OTDOA assistance data to the UE 115 for the reference network node (e.g., base station 105-1 in the example of FIG. 5) and the neighbor network nodes (e.g., base stations 105-2 and 105-3 in the example of FIG. 5) relative to the reference network node. For example, the assistance data may provide the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other cell related parameters applicable to OTDOA, as described above. The OTDOA assistance data may also indicate the serving cell for the UE 115 as the reference network node.

In an aspect, while the location server (e.g., location server 101) may send the assistance data to the UE 115, alternatively, the assistance data can originate directly from the network nodes (e.g., base stations 105) themselves (e.g., in periodically broadcasted overhead messages, etc.). Alternatively, the UE 115 can detect neighbor network nodes itself without the use of assistance data.

In the example of FIG. 4, the measured time differences between the reference cell of base station 105-1 and the neighboring cells of base stations 105-2 and 105-3 are represented as $\tau_2-\tau_1$ and $\tau_3-\tau_1$, where $\tau_1$, $\tau_2$, and $\tau_3$ represent the transmission time of a reference RF signal from the transmitting antenna(s) of base station 105-1, 105-2, and 105-3, respectively, to the UE 115, and includes any measurement noise at the UE 115. The UE 115 may then convert the ToA measurements for different network nodes to RSTD measurements (e.g., as defined in 3GPP TS 36.214 entitled "Physical layer; Measurements") and (optionally) send them to the location server 101. Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 115 position may be determined (either by the UE 115 or the location server 101).

The ToA $T_i$ at the UE 115 for the shortest path from base station i is $$T_i = \tau_i + \frac{D_i}{c},$$

where $D_i$ is the Euclidean distance between the base stations i with location ($q_i$) and the UE 115 with location (p), c is the speed of light in the air (299700 km/s), and $q_i$ is known through the cell information database. The Euclidean distance (i.e., the line distance between two points) is given by:

$$c(T_i - \tau_i) = \sqrt{2}R\sqrt{1-\sin(\varphi_1)\sin(\varphi_2)-\cos(\varphi_1)\cos(\varphi_2)\cos(\beta_1-\beta_2)},$$

where D is the distance between two points on the surface of the earth, R is the radius of the earth (6371 km), $\varphi_1$, $\varphi_2$ is the latitude (in radians) of the first point and the latitude (in radians) of the second point, respectively, and $\beta_1$, $\beta_2$ is the longitude (in radians) of the first point and the latitude (in radians) of the second point, respectively.

To identify the ToA of a reference RF signal transmitted by a given network node, the UE 115 first jointly processes all the resource elements (REs) on the channel on which that network node (e.g., base station 105) is transmitting the reference RF signal, and performs an inverse Fourier transform to convert the received RF signals to the time domain. The conversion of the received RF signals to the time domain is referred to as estimation of the Channel Energy Response (CER). The CER shows the peaks on the channel over time, and the earliest "significant" peak should therefore correspond to the ToA of the reference RF signal. Generally, a UE will use a noise-related quality threshold to filter out spurious local peaks, thereby presumably correctly identifying significant peaks on the channel. For example, a UE 115 may chose a ToA estimate that is the earliest local maximum of the CER that is at least X dB higher than the median of the CER and a maximum Y dB lower than the main peak on the channel. The UE 115 determines the CER for each reference RF signal from each network node in order to determine the ToA of each reference RF signal from the different network nodes.

When the UE 115 obtains a location estimate itself using OTDOA measured time differences, the necessary additional data (e.g., network nodes' locations and relative transmission timing) may be provided to the UE 115 by a location server (e.g., location server 101). In some implementations, a location estimate for the UE 115 may be obtained (e.g., by the UE 115 itself or by the location server 101) from OTDOA measured time differences and from other measurements made by the UE 115 (e.g., measurements of signal timing from GPS or other GNSS satellites). In these implementations, known as hybrid positioning, the OTDOA measurements may contribute towards obtaining the UE's 115 location estimate but may not wholly determine the location estimate.

Uplink Time Difference of Arrival (UTDOA) is a similar positioning method to OTDOA, but is based on uplink reference RF signals transmitted by the UE (e.g., UE 115). Further, transmission and/or reception beamforming at the network node and/or UE 115 can enable wideband bandwidth at the cell edge for increased precision. Beam refinements may also leverage channel reciprocity procedures in 5G NR.

Figure 5A:
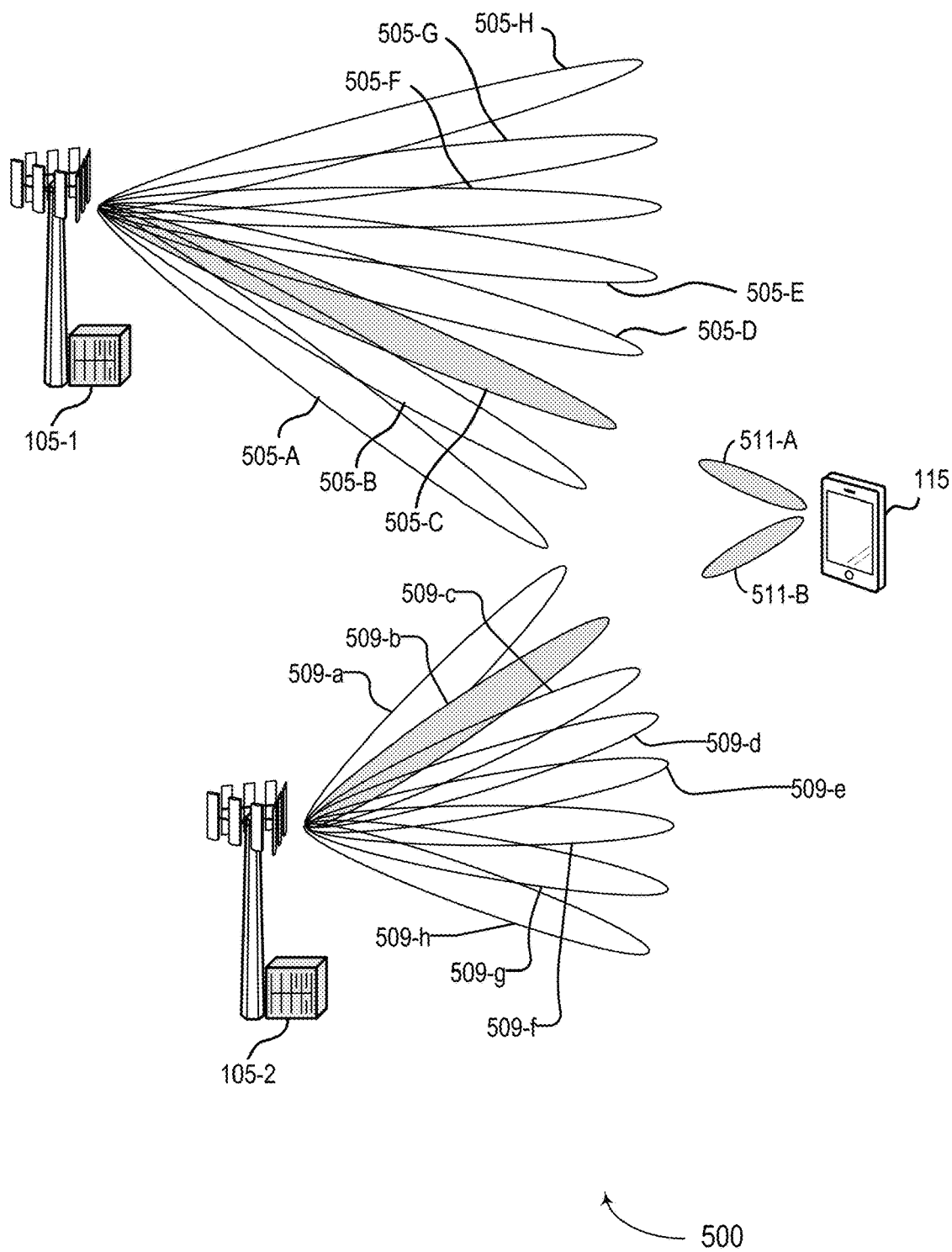
FIG. 5A and FIG. 5B are diagrams illustrating exemplary techniques for PRS transmission using radio beams.

The OTDOA operation in FIG. 4 can be performed in a 5G NR environment in which the position reference signals are transmitted using radio beams. FIG. 5A by way of example, illustrates a simplified environment 500 including two base stations 105-1 and 105-2 producing directional beams for transmitting PRS signals, and a UE 115. Each of the directional beams is rotated, e.g., through 120 or 360 degrees, for each beam sweep, which is periodically repeated. Each direction beam can include a PRS resource, where base station 105-1 produces a PRS resource set that includes PRS resources (or beams) 505-a, 505-b, 505-c, 505-d, 505-e, 505-f, 505-g, and 505-h, and the base station 105-2 produces a PRS resource set that includes PRS resources (or beams) 509-a, 509-b, 509-c, 509-d, 509-e, 509-f, 509-g, and 509-h.

The UE 115 may receive the PRS resources in a direct Line Of Sight (LOS) connection or non-LOS connection (or near LOS connection). In a direct LOS connection, the UE 115 receives the PRS resource from the base station directly, whereas non-LOS and near LOS connections the UE 115 receives the PRS resource indirectly, e.g., after one or more reflections, which increases signal travel time, and/or blockage, which decreases signal strength. Some or all of the PRS resources in a PRS resource set from a base station may suffer from loss of LOS.

The base station 105-1 may serve as a reference base station and base station 105-2 may serve as a target (neighbor) base station in an RSTD measurement performed by the UE 115. The UE 115 may perform ToA measurements of each of the PRS resources received from reference base station 105-1 and may choose to use more than one PRS resource as a reference PRS resource from the reference base station 105-1. For example, as illustrated with shading in FIG. 5A, PRS resource 505-c may be selected by the UE 115 as part of a subset of PRS resources to be used as reference PRS resources for a RSTD calculation. The selection of PRS resource 505-c can be from a receive-side beam sweeping operation as described in FIG. 1C, in which UE 115 determines that the PRS signal strength (e.g., the reference signal receive power (RSRP)) is the highest for a beam-pair comprising a transmit beam that carries PRS resource 505-c and a receive beam 511-a, among the transmit beams that transmit PRS resources 505-a to 505-h. Similarly, UE 115 may perform ToA measurements with base station 105-2 and may choose to use more than one PRS resource as a reference PRS resource from base station 105-2. For example, as illustrated with shading in FIG. 5A, PRS resources 509-b may be selected by the UE 115 as part of a subset of PRS resources to be used as target PRS resources for a RSTD calculation. The selection of PRS resource 509-b can also be from a receive-side beam sweeping operation as described in FIG. 1C, in which UE 115 determines that the PRS signal strength (e.g., the reference signal receive power (RSRP)) is the highest for a beam-pair comprising a transmit beam that carries PRS resource 509-b and a receive beam 511-b, among the transmit beams that transmit PRS resources 509-a to 509-h.

The selected subset of PRS resources from the reference base station 105-1 may be combined in any desired manner to produce a reference ToA and the selected subset of PRS resources from the target (neighbor) base station 105-2 may be similarly combined to produce a target ToA, where the RSTD may be determined as the $\text{ToA}_{target}\text{-ToA}_{reference}$. For example, the ToAs from the selected PRS resources from the reference base station may be linearly averaged to produce the $\text{ToA}_{reference}$. A weighted average may be used, e.g., with the quality of the ToA measurement, e.g., estimated uncertainty, for each selected PRS resource serving as weights. The combined ToA measurements based on the selected PRS resources may be produced in other manners. The combined ToA may be produced by the UE 115 and provided to the location server 101, or used to produce a RSTD measurement which is provided to the location server 101.

There are various potential issues with the selection of PRS resources in FIG. 5A. First, the transmit-side and receive-side beam-sweeping operations, which enable searching and formation of a beam-pair between UE 115 and each of base stations 105-1 and 105-2 to transmit PRS signals, can incur substantial overhead. Specifically, as described in FIG. 1C, base station 105 can transmit, sequentially, one or more transmit beams at targeted at different directions, whereas UE 115 can search, sequentially, over a number of beam directions for a receive beam. In a case where base station 105 transmits M beams for M PRS resources, and that UE 115 sweeps through N receive beam directions, the total overhead for searching the beam-pair that give rise to the maximum signal strength of received PRS resources is in the order of M×N. In addition, in a case where UE 115 performs an exhaustive search for beam pairs searches for C base stations that provide PRS resources, as in FIG. 5A (wherein C=2), the overhead of the exhaustive search can become in the order of M×N×C. Referring back to FIG. 3, the PRS period may need to be increased to accommodate the substantial overhead incurred in the searching of beam-pair for PRS signal transmission. This can reduce the rate of location estimate operation and can degrade the accuracy of location estimate especially when UE 115 is fast moving (e.g., on a moving vehicle).

Figure 5B:
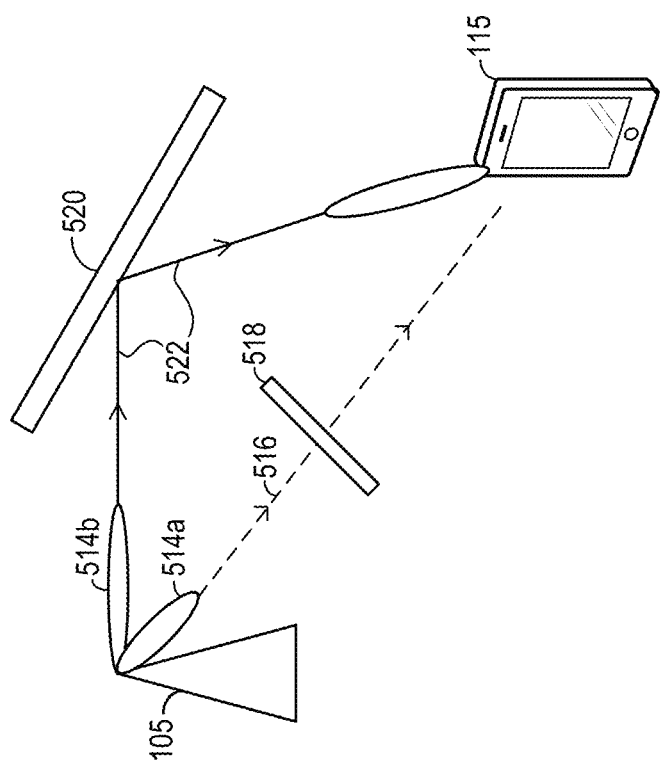

In addition, the searching of beam-pair based on PRS signal strength can lead to using PRS resource from non-LOS connection for RSTD measurement. This can lead to error in the RSTD measurement as the time of arrival (ToA) of the PRS signal no longer reflects the shortest path between the base station and the UE. FIG. 5B illustrates an example of selecting PRS resource from a non-LOS connection for RSTD measurement. In FIG. 5B, base station 105 transmits a beam 514a and a beam 514b, each carrying a PRS signal. The transmitted signal from beam 514a may contain the shortest LOS path 516 to UE 115, but attenuated by an obstacle 518. On the other hand, beam 515b is reflected by a surface 520 and reach UE 115 through a longer and non-LOS path 522, but beam 515b experiences a lesser degree of attenuation than beam 515a. In some examples, path 516 may still be one of the multi-paths and not the true LOS path, but still provides a shorter path than path 522, such that beam 514a has a shorter transit time than beam 515b. If UE 115 searches for a beam-pair that provides the largest PRS signal strength among all candidate beam-pairs, UE 115 may select receive beam 524 that aligns with the reflected transmit beam 514b to form a beam-pair with transmit beam 514b to receive the PRS signal, and use the PRS signal for RSTD measurement. But such arrangement introduces error to the RSTD measurement, as the ToA of the PRS signal received via the beam-pair does not represent the shortest LOS path 516 between base station 105 and UE 115.

Figure 6A:
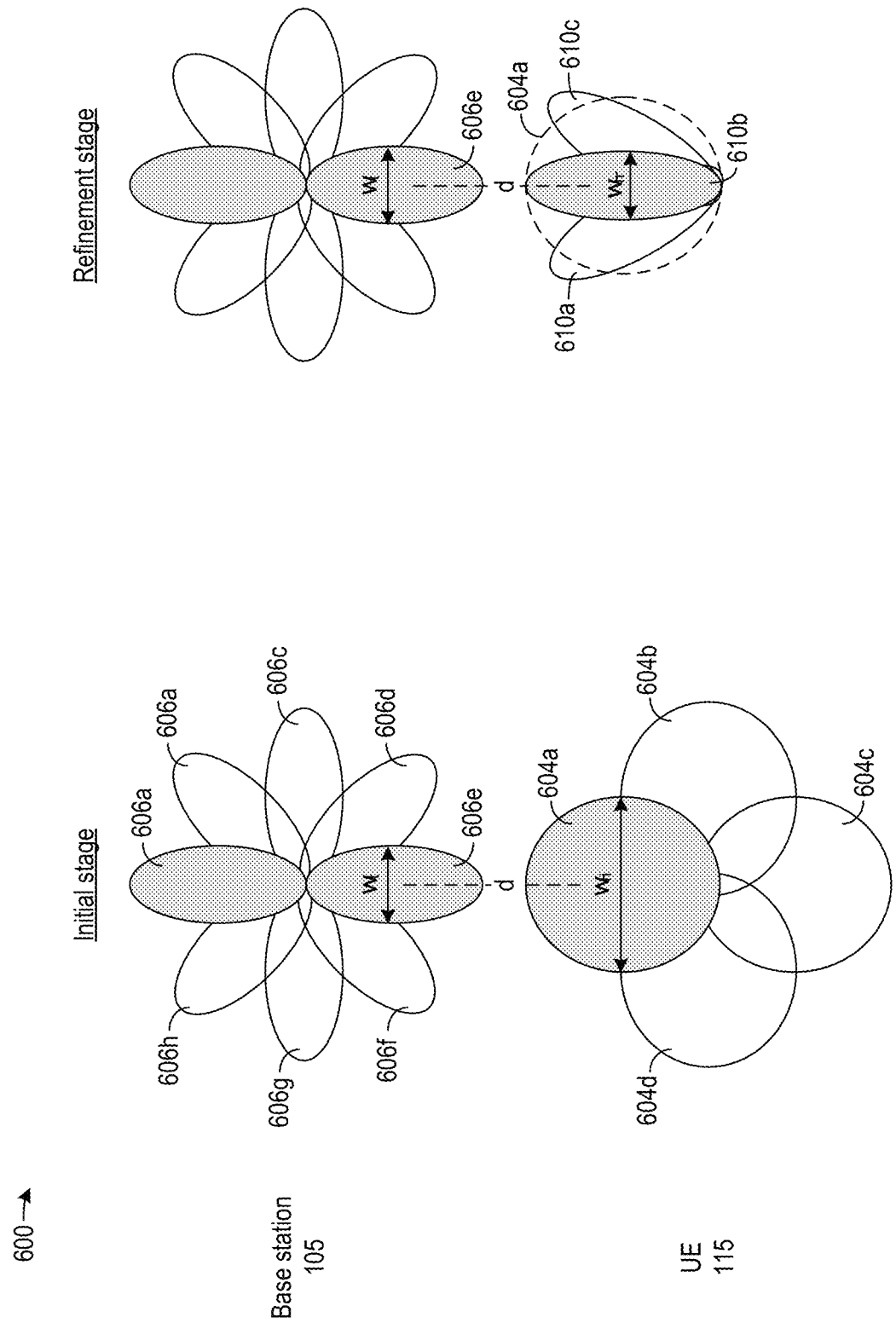

FIG. 6A and FIG. 6B illustrate examples of a method 600 of performing a beam-pair search at an UE (e.g., UE 115) that can address at least some of the issues described above. As shown in FIG. 6A, UE 115 can perform the beam-pair search in at least two stages, including an initial stage and a refinement stage. In an initial stage, UE 115 can use a receive beam 604 (e.g., receive beams 604a, 604b, 604c, 604d, 604e, 604f, 604g, and 604h) to search for a transmit beam 606 (e.g., transmit beams 606a, 606b, 606c, and 606d etc.) from base station 105, to form an initial beam-pair. As explained above, each receive beam 604 corresponds to a spatial filtering configuration of the antenna array at UE 115 to detect a transmitted signal in a detection region, with the detection region defined by a particular beam direction and having a beam width centers around the beam direction. Each receive beam 604 has a wider beam width $w_{ri}$ than, for example, receive beam 170 of FIG. 1C, as well as a transmit beam 606 which has a beam width $w_t$, which enables UE 115 to sweep through a fewer number receive beams to search for the transmit beam. In the example of FIG. 6A, base station 105 can sweep through eight transmit beams 604a-604h, whereas UE 115 may only need to sweep through four receive beams 606a-606d to perform the initial search.

Each transmit beam 606 can carry a reference signal, such as an SS, a PRS, etc. The target for the initial beam-pair search can be to find an initial beam-pair that provides the largest reference signal strength (e.g., RSRP), or an initial beam-pair that provides the earliest arrival of the reference signal (e.g., based on measuring the timestamp of the peak of the reference signal), among all candidate beam-pairs of transmit beams 606 and receive beams 604. In FIG. 6A, UE 115 may form an initial beam-pair comprising transmit beam 606e and receive beam 604a, as the two beams face directly to each other and align along the same beam direction (labelled d), and signals (e.g., reference signals) transmitted in transmit beam 606e travel through the shortest distance between base station 105 and UE 115 to be received by the antenna array of UE 115 having the receive direction defined by receive beam 604a. As a result, a reference signal received through that initial beam-pair can have both the strongest strength as well as the earliest arrival time, among other candidate beam-pairs. In some examples, UE 115 can perform a measurement (e.g., time of arrival (ToA)) based on the reference signals received via the initial beam-pair, which can serve as a baseline of the measurement for the subsequent refinement stage.

After the initial beam-pair is selected, UE 115 can perform a refined search of transmit beam using receive beams 610 each with a reduced beam width $w_{ri}$. As part of the refined search, UE 115 can perform a limited beam-sweeping operation to sweep through a number of receive beams 610 (e.g., receive beams 610a, 610b, and 610c) that overlap with receive beam 604a selected in the initial stage. The target of the search can be to find a refined beam-pair that provides the earliest arrival of the reference signal. In FIG. 6A, UE 115 can select receive beam 610b to pair with transmit beam 606e to form a refined beam-pair, as the two beams face directly to each other and align along the same beam direction d, such that transmit beam 606e travels through the shortest distance between base station 105 and UE 115 to be received by the antenna array of UE 115 having the receive direction defined by receive beam 604a. UE 115 can perform measurement of reference signals (e.g., ToA) received via the refined beam-pair to provide a refined location estimate. In addition, UE 115 can also verify the refined measurement using the baseline measurement obtained from the initial stage. For example, UE 115 may keep the refined measurement result if it shows an earlier ToA than the baseline measurement result, which indicates that the refined beam-pair receives the PRS signal along the shortest path between UE 115 and base station 105. On the other hand, if the refined measurement result shows a later ToA than the baseline measurement result, UE 115 may discard the refined measurement result. As to be described below, UE 115 can perform additional refined searches of transmit beams to further refine the location estimate result, and/or to search for a different transmit beam from a different base station.

With the arrangements of FIG. 6A, the number of receive beams swept by UE 115 can be reduced, which can reduce the overhead incurred by the beam-sweeping operation in the location estimate operation. This allows shrinking the PRS period and increase the rate of location estimate operation, and the accuracy of location estimate, especially when UE 115 is fast moving (e.g., on a moving vehicle), can be improved as a result.

The multi-stage beam-sweeping operation can also improve the location estimate operation in an environment where UE 115 can receive non-LOS beams due to reflection, as described in FIG. 5B. Referring to FIG. 6B, in the initial stage UE 115 can select receive beam 604a to detect a reference signal carried by a transmit beam 608, which travels from base station 105-1 through the shortest LOS path 516 to UE 115 but attenuated by obstacle 518, and through non-LOS path 522 to UE 115 due to reflection by surface 520. Due to the wide beam width $w_{ri}$ of receive beam 604a, UE 115 can detect the reference signal carried by transmit beam 608 via both LOS path 516 and non-LOS path 522. UE 115 can select receive beam 604a based on, for example, the reference signal strength received from base station 105-1 via receive beam 604a being the highest among other receive beams. In addition, UE 115 can also select receive beam 604c to receive transmitted signal from transmit beam 614 from base station 105-2, which travels through the shortest LOS path 616 to UE 115. The selection can be based on the reference signal strength received from base station 105-2 via receive beam 604c being the highest among other receive beams.

After selecting receive beams 604a and 604c in the initial stage, UE 115 can perform a refined search of receive beams in the subsequent refinement stage. The target of the refined search can be to find a beam-pair for which the reference signal has the earliest time of arrival (ToA). In the refinement stage, UE 115 can perform a search using receive beams 610 having a reduced beam width $w_{ri}$ and that overlap with receive beam 604a to form a refined beam-pair with base station 105-1. UE 115 can also perform a search using receive beams 612 having reduced beam width $w_{ri}$ and that overlap with receive beam 604c to form a refined beam-pair with base station 105-2.

As a result of the refined search, UE 115 can select receive beam 610a to pair with transmit beam 608 to form a refined beam-pair, instead of receive beam 610b with transmit beam 608, as the reference signal carried by transmit beam 608 travels along the shortest LOS path between base station 105-1 and UE 115 when detected by receive beam 610a, which results in the earliest ToA compared with a beam-pair comprising transmit beam 514b and receive beam 610b. In addition, UE 115 can select receive beam 612a to pair with transmit beam 614 to form another refined beam-pair with base station 105-2. The selection can be based on the refined beam-pair being aligned along the shortest path between UE 115 and base station 105-2, which results in the earliest ToA of reference signal from base station 105-2 among other candidate beam-pairs. As UE 115 can perform the location estimate operation based on reference signals that arrive via the shortest LOS path from each base station, the accuracy of the location estimate operation can be improved as a result.

Figure 7:
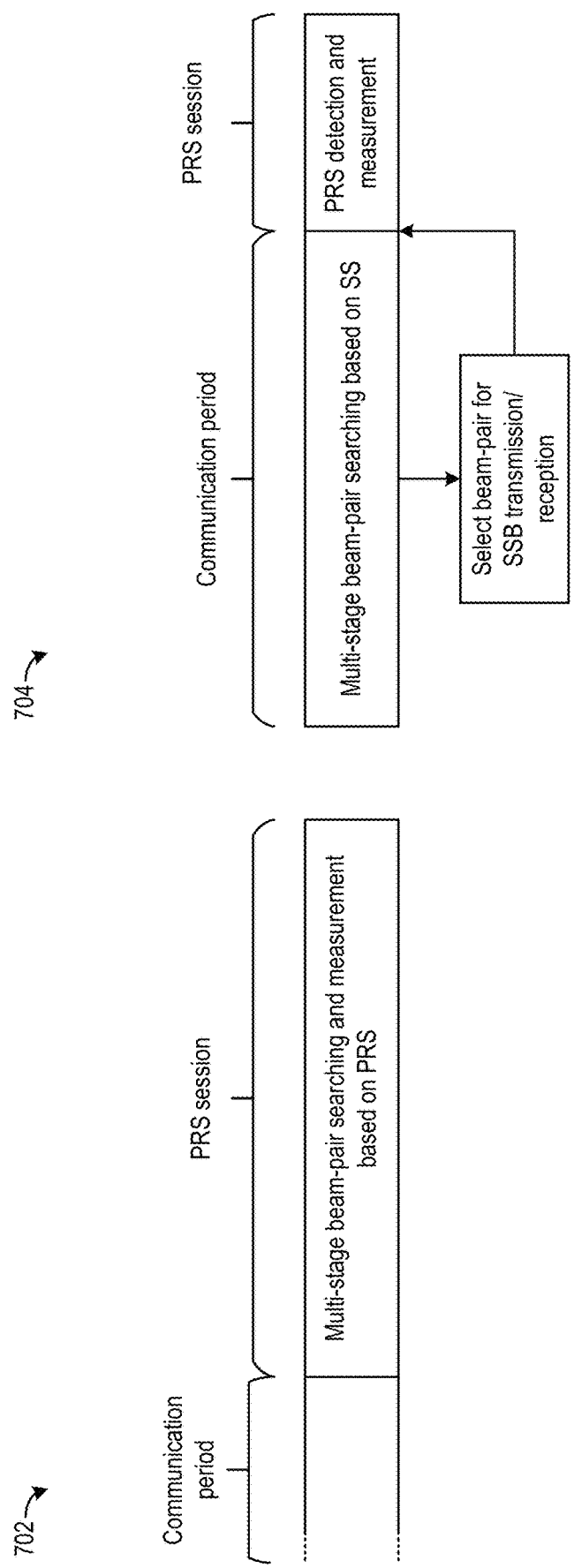
FIG. 7 is a diagram illustrating examples of multi-stage beam sweeping operations in different wireless communication operations in accordance with aspects of the present disclosure.

The multi-stage beam-sweeping operation can be performed in different wireless communication operations. For example, referring to FIG. 7, in a multi-stage beam-sweeping operation 702, a multi-stage beam-sweeping operation can be performed during a PRS positioning occasion (e.g., PRS positioning occasions 318a, 318b, 318c, etc.). PRS measurements can also be performed as part of a beam management session.

As another example, a multi-stage beam-sweeping operation 704 can be performed during a communication period in which UE 115 and base station 105 perform data communication (e.g., voice data, content data, etc.) before a PRS session, and the beam-pair obtained from the multi-stage beam-sweep operation during the communication period can be used to select the beam-pair for transmission and reception of PRS signals in the subsequent PRS positioning occasion. The multi-stage beam-sweeping operation can be based on synchronization signals (SS), such as PSS, SSS, PBCH signals, etc. The sweeping operation can be performed to select both a transmit beam (from base station 105) and a receive beam (at UE 115), if the capability of UE 115 and real time resource allow, or to select a receive beam for a pre-set transmit beam. As described above in FIG. 1C, in an SS burst, a base station 105 can transmit multiple transmit beams carrying multiple SS blocks. Each SS block can contain four symbols with PSS, SSS, and PBCH. Each SS block is transmitted by one transmit beam, and different beams can be transmitted to carry different SS blocks. To select both transmit beam and receive beam, UE 115 can perform, in each SS burst, a multi-stage beam-sweeping operation (an initial stage with wide receive beams, followed by a refinement stage with narrow receive beams) to search for a receive beam to pair with a transmit beam. A candidate beam-pair can be formed after each SS burst for each SS block, and the beam-pair that give rises to the earliest arrival of the SS signal can be selected as the beam-pair for PRS.

The beam-pair selection can then be used, to example, select a transmit beam and a receive beam for PRS signal transmission and reception during the subsequent PRS session for both serving cell and non-serving cell. For non-serving cells, the UE may report the beam pair selections through UCI/MAC-CE/RRC to the base station of the serving cell, and then serving cell can forward the beam selection to non-serving cell via Xn interface. In another example, the beam selection can be reported to a location management function (LMF), then the LMF sends the beam pair selection to the non-serving cell. For the serving cell, UE may report the beam selection to the serving cell directly via UCI, MAC-CE, RRC, or report to LMF first and then LMF send the beam selection to the serving gNB.

Figure 8A:
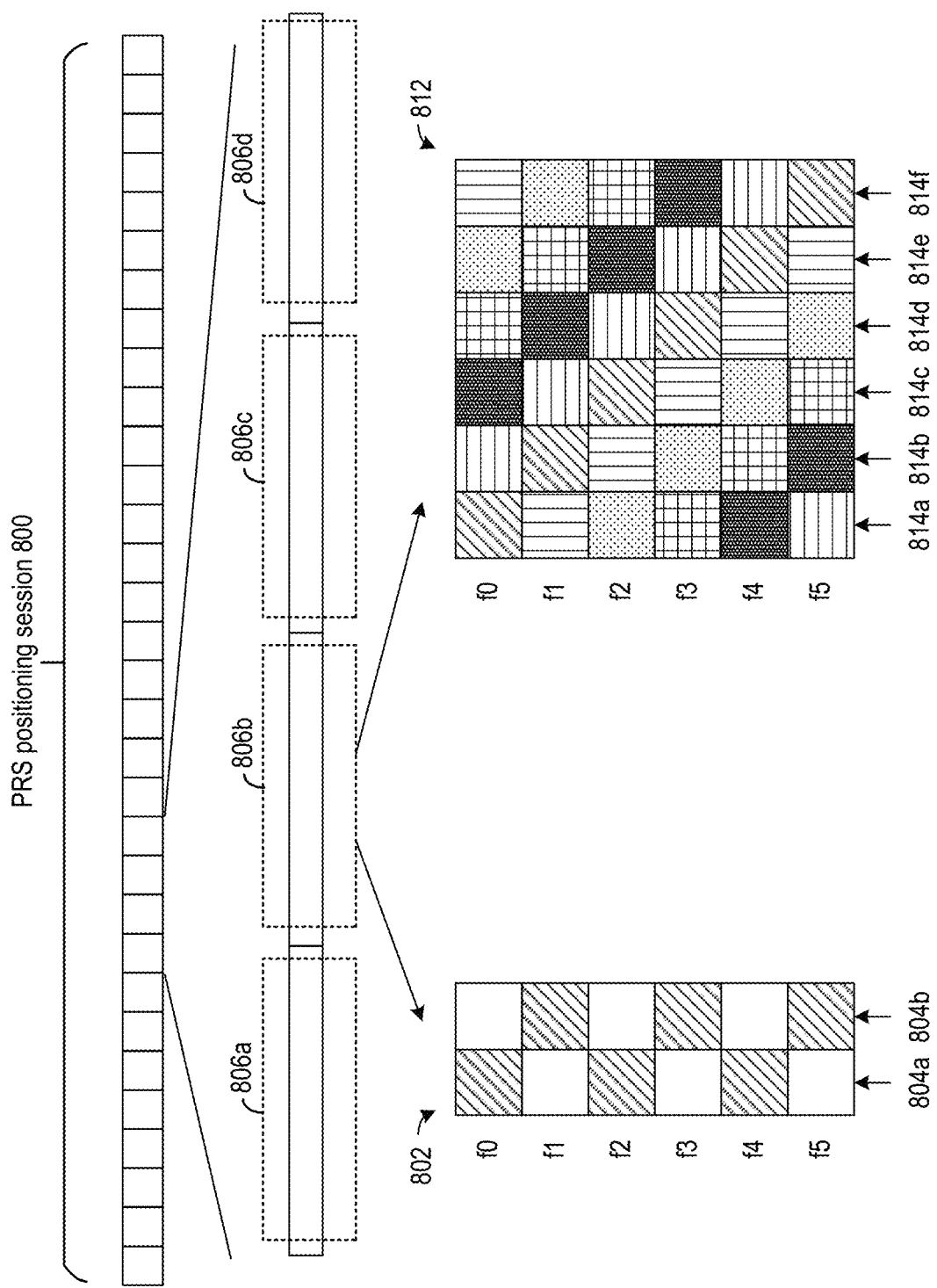
FIG. 8A and FIG. 8B are diagrams illustrating examples of multi-stage beam sweeping operations in a PRS positioning occasion in accordance with aspects of the present disclosure.
Figure 8B:
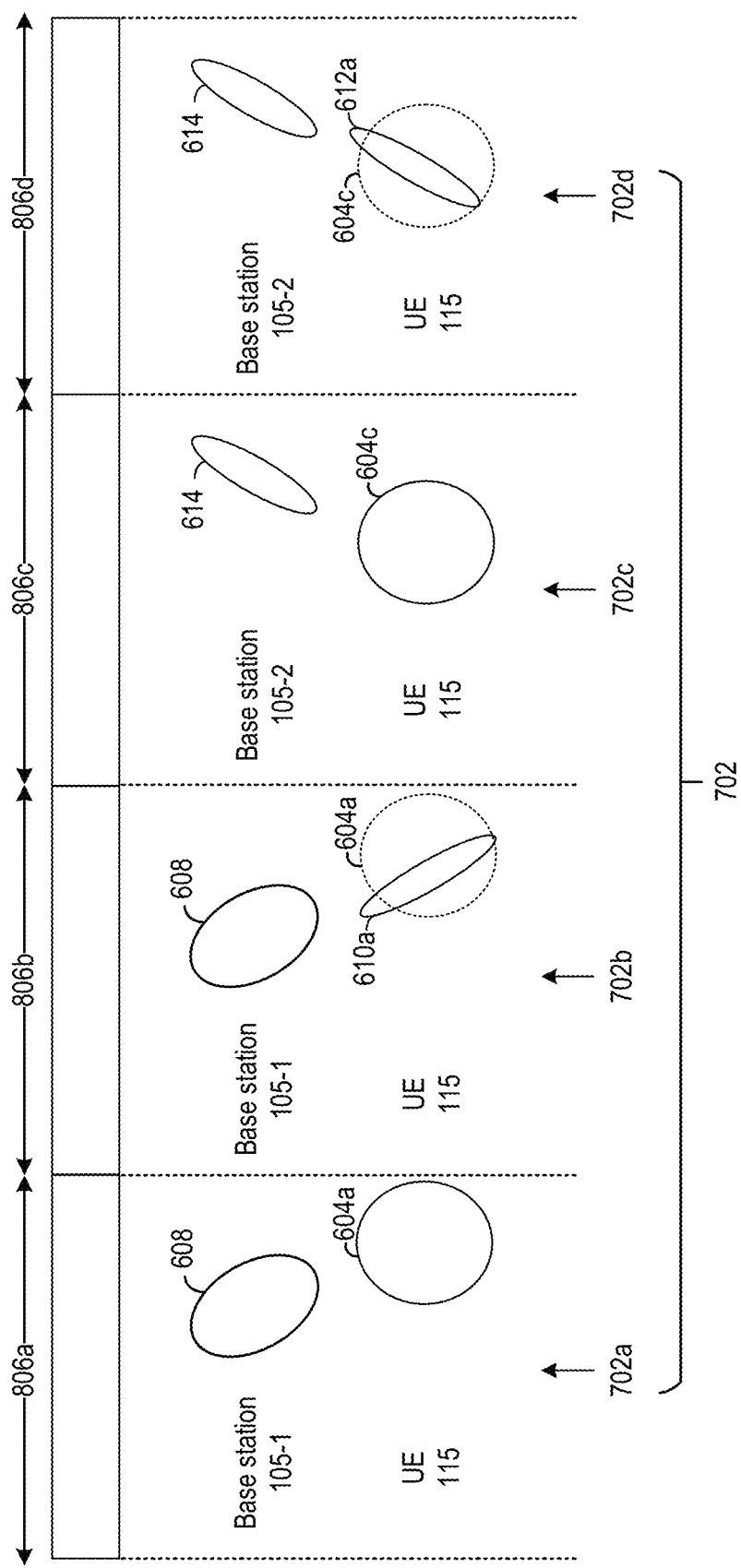

FIG. 8A and FIG. 8B illustrate examples of a PRS session 800 in which multi-stage beam-sweeping operation 702 can be performed. In PRS session 800, each square can represent a PRS instance, which can include a PRS symbol or multiple PRS symbols. Each symbol can be formed based on a PRS resource comprising one or more REs, as described in FIG. 2A and FIG. 2B, to form one or more PRS instance signals. The REs can form PRS resources sets associated with multiple base stations (identified by cell IDs) and beams (identified by beam IDs), so that each symbol can include one or more PRS signals transmitted by different base stations.

In one example, a PRS resource can have a comb-2 structure 802 including two consecutive OFDM symbols 804a and 804b to carry one PRS resource signals, with a PRS repetition factor of 4, in four PRS instances 806a, 806b, 806c, and 806d. OFDM symbol 804a includes a first part (represented by shaded blocks) formed by a first subset of REs f0, f2, and f4 and transmitted by, for example, base station 105-1, as well as a second (represented by clear blocks) formed by a second subset of REs f1, f3, and f5 and transmitted by, for example, base station 105-2. In addition, OFDM symbol 804b includes a first part formed by the second subset of REs f1, f3, and f5 (represented by shaded blocks) and transmitted by base station 105-1, as well as a second part formed by the first subset of REs f0, f2, and f4 (represented by clear blocks) and transmitted by base station 105-2. To perform a ToA measurement, UE 115 can perform PRS measurement of the received PRS signal.

The PRS resources can be transmitted using a first PRS transmit beam (e.g., transmit beam 514a of FIG. 6B) by base station 105-1, and a second PRS transmit beam (e.g., transmit beam 514b of FIG. 6B) by base station 105-2. For example, to transmit symbols 804a and 804b, transmit beam 514a is associated with a first resource comprising shaded REs f0, f2, and f4 in 804a and shaded REs f1, f3, and f5 in 804b, and transmit beam 514b is associated with a second resource comprising white REs f1, f3, and f5 in 804a, and white REs f0, f2, and f4 om 804b. Alternatively, according to some embodiments, rather than associating the beams on a per-resource basis, beams may be associated with resources on a per-symbol basis, which may have the benefit of beam paring overhead reduction. The two PRS transmit beams can form different beam-pairs with different receive beams (e.g., receive beams 610a and 612a) and different transmit beams (e.g., transmit beams 608 and 614) at UE 115 for transmission of the PRS signals. For example, referring back to the example of FIG. 6B, receive beam 610a can form a beam-pair with transmit beam 608, whereas receive beam 612a can form a beam-pair with transmit beam 614.

In another example, a PRS resource can include a comb-6 structure 812 including 6 consecutive symbols, symbols 814a, 814b, 814c, 814d, 814e, and 814f to carry one PRS instance signals, with a PRS repetition factor of 4, in PRS instances 806a, 806b, 806c, and 806d. Different base stations/beams can be associated with different shading patterns. For example, a first base station can use an RE associated with f0 to transmit symbol 814a, an RE associated with f1 to transmit symbol 814b, an RE associated with f2 to transmit symbol 814c, an RE associated with f3 to transmit symbol 814d, an RE associated with f4 to transmit symbol 814e, and an RE associated with f5 to transmit symbol 814f.

In addition, a second base station can use an RE associated with f1 to transmit symbol 814a, an RE associated with f2 to transmit symbol 814b, an RE associated with f3 to transmit symbol 814c, an RE associated with f4 to transmit symbol 814d, an RE associated with f5 to transmit symbol 814e, and an RE associated with f0 to transmit symbol 814f. The other base stations also use a different sets of REs to transmit the symbols.

FIG. 8B illustrates an example of multi-stage beam-sweeping operation 702 performed over PRS instances 806a-806d. In FIG. 8B each PRS resource may be transmitted using a comb-2 structure 802 by two base stations 105-1 and 105-2. During PRS instance 806a corresponding to a first repeated PRS instance, UE 115 can perform the initial stage of beam-sweeping operation 702 (operation 702a) using a wide receive beam 604. The wider receive beams can provide better coverage (or signal strength) to receive PRSs from different base stations which are at different locations. The searching can be based on, for example, finding a beam-pair for which the received signal strength of the PRS is the highest, or for which the PRS has the earliest arrival time, among other candidate beam-pairs. As a result of operation 702a, UE 115 may select receive beam 604a as the receive beam to form an initial beam-pair with transmit beam 608. UE 115 can also perform a measurement (e.g., ToA measurement) of the PRS received via the initial beam-pair as a baseline ToA measurement of the PRS.

After operation 702a completes, UE 115 can then proceed with operation 702b in measurement PRS instance 806b. As part of operation 702b, UE 115 can perform a refined search using narrow receive beams 610 that overlap with wide receive beam 604a to pair with transmit beam 608, or with another beam from a different base station. The search can be based on finding a refined beam-pair for which the received first PRS signal has the earliest time of arrival among other candidate beam-pairs.

The refinement can be done on the level of per symbol, a subset of symbols within the entire PRS instance, or based on all the symbols received within the entire PRS instance. In per-symbol refinement, UE 115 can search for a receive beam to detect PRS signals from one or more base stations in a symbol, and use the detected PRS signals in the symbol to perform ToA measurement. This allows UE 115 to use different receive beams to detect PRS signals in different symbols. For example, referring back to the example comb-2 structure 802 of FIG. 8A, UE 115 can use a first receive beam (e.g., radio beam 610a) to receive symbol 804a. UE 115 can perform first timing measurements based on PRS carried by REs f0, f2, and f4 from base station 105-1 and based on PRS carried by REs f1, f3, and f5 from base station 105-2. UE 115 can then use a second receive beam (e.g., radio beam 610b) to receive symbol 804b, and perform second timing measurements based on PRS carried by REs f1, f3, and f5 from base station 105-1 and based on PRS carried by REs f0, f2, and f4 from base station 105-2. But performing timing measurement at the symbol level can reduce the accuracy of the timing measurement. Specifically, at the symbol level there are frequency discontinuities in the PRS signal (e.g., f0, f2, and f4 for PRS from one base station, f1, f3, and f5 for PRS from another base station, leading to huge side lobes. If the side lobes are used to determine the timing, the accuracy of timing measurement can be degraded.

On the other hand, in a PRS-instance level refinement, a single beam-pair is selected to detect PRSs from one or more base stations in multiple symbols within a PRS instance. The selection can be based on, for example, that single beam-pair providing the earliest timing among all symbols within the PRS instance. As a result, the different REs of PRS in different symbols can be combined in a de-staggering operation. Because of the de-staggering operation, the frequency discontinuities in the PRS signal can be removed, which can reduce aliasing and reduce the side lobe of the recovered signal, and the accuracy of timing measurement can be improved. Moreover, if the selected radio beam provides sufficient PRS signal strength for the PRS measurement with only a single base station within a PRS instance, and have significant beamforming loss with other base stations, the detection and measurement of PRS signal from another base station can only occur in the next PRS instance.

Following operation 702b, UE 115 can proceed with operation 702c in PRS instance 806c, followed by operation 702d in PRS instance 806d. Depending on the operation condition (e.g., the PRS repetition factor, the comb structure, the number of transmit beams, etc.), UE 115 can perform different beam-sweeping operations.

In one example, in PRS instance 806c, UE 115 can perform another beam-sweeping operation 702 to search for another receive beam to pair with transmit beams. The objective of the search may be to explore other receive beams to receive PRS from base stations with the earliest ToA, to see if the PRS detected via those receive beams has an earlier ToA for those base stations, and to measure the earliest ToA from those base stations.

In another example, PRS instance 806 may include six repeated PRS instance (with a PRS repetition factor of 6). In such a case, UE 115 can perform searching and refinement of beam-pair for transmit beams 608 and 614 in the first four PRS instances, as described above. UE 115 can then perform additional ToA measurements of the PRS using the refined beam-pairs in the fifth and sixth PRS instances.

In another example, UE 115 may further refine the search of receive beams to pair with transmit beam 608 using, for example, even narrower receive beams than receive beam 610a, in operations 702c and 702d, and use the further refined beam-pairs to measure the PRS.

In a case where UE 115 performs PRS measurements with six base stations and receives comb-6 structured PRS resources, UE 115 can also perform multiple initial and refined beam-pair searching operations within PRS instance 806 using multiple PRS resources to form a beam-pair with each of the six base stations.

At the end of PRS instance 806, UE 115 can combine the PRS measurement results (e.g., ToA) using the wide and narrow receive beams using various techniques. For example, UE 115 can compute the mean and/or median of the PRS measurement results, and provide the mean and/or median as a combined PRS measurement result. As another example, UE 115 can also pick one of the measurement as part of a refinement/correction operation. For example, UE 115 can discard the baseline measurement using the wide receive beam and provide the measurement result using the narrow receive beam instead, if the refined measurement result indicates an earlier ToA than the baseline measurement result, which suggests that the refined measurement result represents a measurement of the shortest path between UE 115 and the base station. As yet another example, UE 115 can also report multiple PRS measurements.

After PRS instance 806, UE 115 can repeat operations 702a-702d for the next set of repeated PRS resources in the next PRS session, or use the refined beam-pair to perform additional PRS measurements, depending on the operation condition. For example, if UE 115 is in a high mobility state with respect to the base stations, UE 115 may repeat operations 702a-702d to select a different wide receive beam to pair with a different transmit beam from the base stations, due to a rapid location change of UE 115.

Figure 9A:
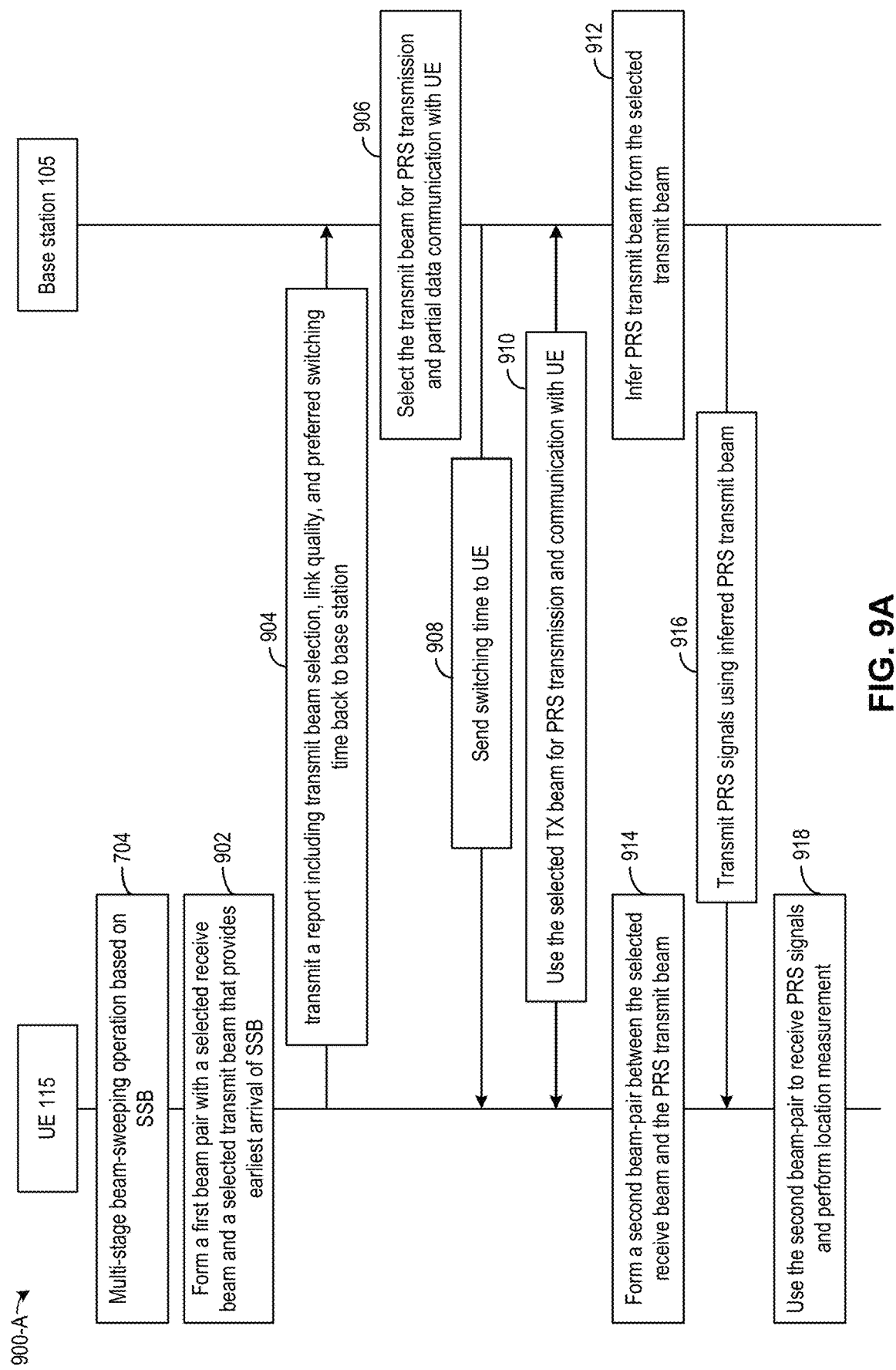

FIG. 9A illustrates a flowchart 900-B of operations between UE 115 and base station 105, including multi-stage beam-pair search operation 704, to support a location estimate operation. Referring to FIG. 9A, within a communication period in which UE 115 and base station 105 preform data communication (e.g., voice data, content data, etc.) before a PRS positioning occasion, a multi-stage beam-sweeping operation can be performed based on synchronization signals (SS), such as PSS, SSS, PBCH signals, etc. The sweeping operation can be performed to select both a transmit beam (from base station 105) and a receive beam (at UE 115), if the capability of UE 115 and real time resource allow, or to select a receive beam for a pre-set transmit beam. To select both transmit beam and receive beam, UE 115 can perform, in each SS burst, a multi-stage beam-sweeping operation (an initial stage with wide receive beams, followed by a refinement stage with narrow receive beams) to search for a receive beam to pair with the transmit beam for the PRS transmission and reception.

In operation 902, UE 115 can form a candidate beam-pair for the subsequent PRS session, and select the beam-pair that give rises to the earliest arrival of the SS block can be selected as the beam-pair.

In operation 904, UE 115 can transmit a report (e.g., via UCI, MAC-CE, RRC, etc.) to base station 105. The report may identify the selected transmit beam and include link quality and preferred switching time.

In operation 906, base station 105 can select the transmit beam indicated in the report for PRS transmission and partial data communication with UE 115 if base station 105 is the serving cell. Base station 105 further sets a scheduled time of switching to the transmit beam for the PRS transmission and data communication based on, for example, the preferred time indicated in the report, traffic condition, etc. Base station 105 can then transmit a message including the switching time to UE 115, in operation 908, and then use the selected transmit beam for the PRS transmission and data communication with UE 115, in operation 910. UE 115 can use the receive beam in the first beam pair to receive downlink communication data from base station 105. Based on the link quality, base station 105 can also change the modulation code scheme, and transmit information indicating the updated modulation code scheme (MCS) to enable UE 115 to extract signals from the first TX beam.

In operation 912, before the PRS positioning occasion starts, base station 105 may determine the PRS transmit beam based on the selected transmit beam provided by UE indication. In some examples, base station 105 may use the same beam (having the same beam identifier) to transmit part of the data communication and PRS, if the link quality meets certain link quality criteria. In a case where different transmit beams (codebook/spatial filtering) are used for PRS and SSB transmission, base station 105 can use Quasi co-location (QCL) relationship to determine the PRS transmit beam from the transmit beam selection reported from UE 115 (in operation 904), and form a second beam-pair in operation 914 for PRS transmission.

Within a PRS position occasion, base station 105 can transmit a PRS signal using the inferred PRS transmit beam, in operation 916. UE 115 can use the second beam-pair to receive the PRS signals and perform location measurement (e.g., timing (RSTD, RxTx) measurement) based on the received PRS signals, in operation 918.

FIG. 9B illustrates a flowchart 900-B of operations between UE 115, location server 101, and one or more base stations 105, providing a variation to the process illustrated in FIG. 9A, according to some embodiments. In this variation, the operations in the flowchart 900-B may replace operations 904 and 906 in the flowchart 900-A as described hereafter, but other functionality may remain substantially similar to the flowchart in 900-A. (Because multiple base stations may be used in the flowchart 900-B, the functionality for base station 105 in the flowchart 900-A may be replicated for each base station.)

In flowchart 900-B of FIG. 9B, rather than the UE 115 providing a report including transit beam selection, link quality, and preferred switching time (at operation 904 of FIG. 9A) directly to the base station 105, the UE 115 can provide this information in a similar report to the location server 101 and, as shown at operation 920. This report may be sent via LPP, and thus may be part of an LPP positioning session, according to some embodiments. Further, rather than the base station 105 selecting transmit beams (at operation 906 of FIG. 9A), the location server 101 can do so, as indicated at operation 922, based on the report received at operation 920. At operation 924, the location server 101 can then send information regarding the selected TX beam(s) to the corresponding base station(s) 105. This information can be sent in a message via NRPPa, for example. Using a location server 101 in the manner illustrated in FIG. 9B can be beneficial in many circumstances, including circumstances in which multiple base stations 105 are used and/or in cases in which a TX beam is transmitted by a base station that is not the serving base station for the UE 115 (e.g., beam searching overhead reduction for neighbor cells).

Figure 11:
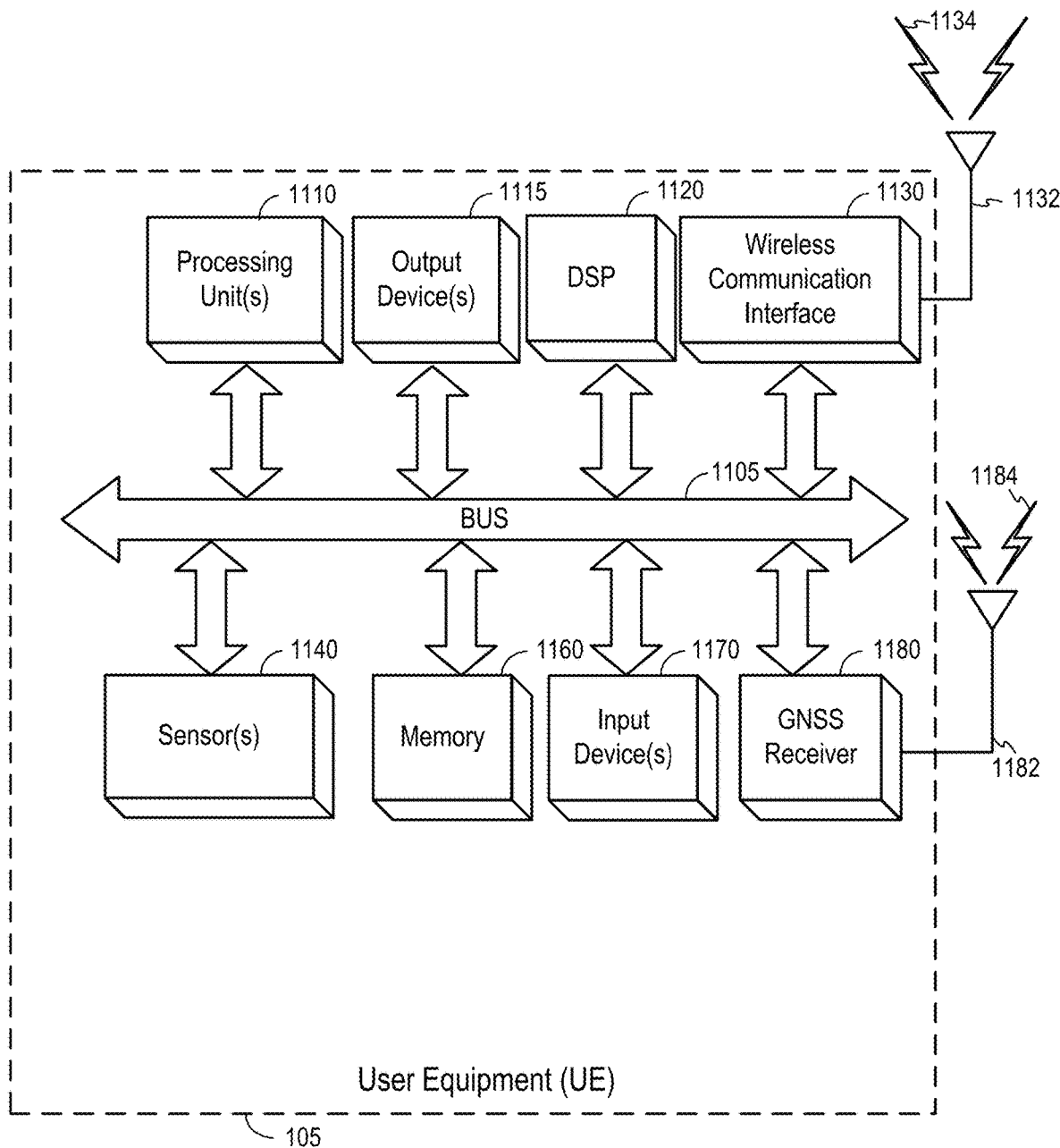
FIG. 11 is a block diagram of an embodiment of a UE capable of supporting multi-stage beam-sweeping operations to support a location estimate operation in NR systems in accordance with aspects of the present disclosure.

FIG. 10 illustrates an example of a process flow 1000. Process flow 1000 can include a multi-stage beam-sweeping operation to identify a beam-pair for PRS detection and measurement, and to perform the PRS detection and measurement operation. Process flow 100 can be performed by, for example, hardware and/or software components of a UE 105. An example of such components is illustrated in FIG. 11 and described hereafter. Alternative embodiments may perform operations in different order and/or implement other variations to the operations illustrated in FIG. 11.

In operation 1002, UE 105 can select from a first number of first receive (RX) beams having a first beam width, a first one of the first number of RX beams to form a first beam-pair with a first transmit (TX) beam from a base station, the selection being based on a first measurement of a first reference signal received by the UE using the first beam-pair, wherein the first measurement is performed based on a first subset of OFDM symbols with which the first reference signal is received by the UE. Specifically, operation 1002 may correspond to an initial stage of the beam-pair search as previously described. The first receive beams can correspond to a first spatial filtering configuration of an antenna array of UE 115. The first receive beams (e.g., receive beam 604 of FIG. 6A) can have relatively wide beam widths each can cover a wider spatial area and can detect reference signals from multiple base stations. The search can be based on identifying the first beam-pair that provides the highest-strength detected signal and/or the detected signal having the earliest ToA. In a case where the search is performed in a PRS session, as shown in FIG. 8A and FIG. 8B, the search can be based on detecting PRS, and a ToA measurement of PRS can be performed using the first beam-pair to provide a baseline measurement. In a case where the search is performed in a communication period, the search is performed based on detecting SSB.

Means for performing operation 1002 can include, for example, one or more wireless communication antenna(s) 1132, processing unit(s) 1110, DSP 1120, and/or memory 1160 of a UE 105, as illustrated in FIG. 11 and described hereafter.

In operation 1004, UE 115 can select from a second number of second RX beams having a second beam width, a first one of the second number of RX beams to form a second beam-pair with the first TX beam, the selection being based on a second measurement of a second reference signal received by the UE using the second beam-pair, the second number of second RX beams being smaller than the first number of first RX beams, and the second beam width being narrower than the first beam width. Specifically, operation 1004 can correspond to a refinement stage of the beam-pair search. The second receive beams can correspond to a second spatial filtering configuration of an antenna array of UE 115. The second receive beams (e.g., receive beams 610a, 610b, and 612a) can have narrower beam widths and cover a narrower spatial area than the first receive beams. The refined beam-pair search can be based on searching for the second beam-pair that provides the detected signal having the earliest ToA. In a case where the search is performed in a PRS session, the refined beam-pair search can be performed on a per-symbol level or on a PRS-instance level. The PRS signal received via the second beam-pair can be measured to provide a refined ToA measurement of the PRS signal.

Means for performing operation 1004 can include, for example, one or more wireless communication antenna(s) 1132, processing unit(s) 1110, DSP 1120, and/or memory 1160 of a UE 105, as illustrated in FIG. 11 and described hereafter.

In operation 1006, UE 115 can perform a location estimate operation of the UE based on: the first reference signal and the second reference signal, the second beam-pair, a third reference signal received by the UE using either the second beam-pair, or a third beam-pair derived from the second beam-pair, or a combination thereof. Specifically, UE 115 can measure the RSTD from a base station. In a case where the beam-pair search operation is performed in a PRS session, as described in FIG. 8A and FIG. 8B, the RSTD measurement can be based on the ToA measured from the PRS signals in operations 1002 and 1004. In a case where the beam-pair search operation is performed in a communication period, a third beam-pair can be selected for transmission (at base station) and detection (at UE 115) of PRS in the subsequent PRS session, as described in FIG. 9.

Means for performing operation 1006 can include, for example, one or more wireless communication antenna(s) 1132, processing unit(s) 1110, DSP 1120, and/or memory 1160 of a UE 105, as illustrated in FIG. 11 and described hereafter.

As described in the embodiments above, alternative embodiments may include additional or alternative functionality. For example, according to some embodiments, the selected first one of the first number of first RX beams may be centered at a first direction and corresponds to a first configuration of an antenna array in which the UE is configured to detect a beam overlapping with the selected first one of the first number of first RX beams, the first beam-pair may be formed based on using the first configuration to detect the first TX beam, the selected first one of the second number of second RX beams may be centered at a second direction and may correspond to a second configuration of the antenna array in which the UE is configured to detect a beam overlapping with the selected first one of the second number of second RX beams (optionally having at least a predetermined signal strength), and the second beam-pair may be formed based on using the second configuration to detect the first TX beam. According to some embodiments, the second direction may comprise one of a plurality of directions of the second number of second RX beams, and the first direction and the first beam width of the selected first one of the first number of RX beams may define the second number of directions of the second RX beams. Additionally or alternatively, the first measurement may comprise measuring a signal power of the first reference signal, and the first beam-pair may be selected based on the first reference signal extracted from the first TX beam detected using the first beam-pair having a highest signal power among other beam-pair combinations of the first number of first RX beams and a group of one or more TX beams comprising the first TX beam.

According to some embodiments, the first measurement may comprise measuring a timestamp of the first reference signal, and the first beam-pair may be selected based on the first reference signal extracted from the first TX beam detected using the first beam-pair having the earliest timestamp among other beam-pair combinations of the first number of first RX beams and a group of one or more TX beams comprising the first TX beam. Additionally or alternatively, the second measurement may comprise measuring a timestamp of the second reference signal, and the second beam-pair may be selected based on the first reference signal extracted from the first TX beam detected using the first beam-pair having the earliest timestamp among other beam-pair combinations of the first number of first RX beams and a group of one or more TX beams comprising the first TX beam. According to some embodiments, the first reference signal, the second reference signal, and the third reference signal comprise at least one of: a PRS, a downlink SS, or both. In such embodiments, the first measurement and the second measurement optionally may be performed in a PRS session comprising a plurality of PRS instances, the subset of OFDM symbols with which the first reference signal may be received by the UE comprises one or more first PRS symbols of a first PRS instance, and the second measurement may be performed based one or more second PRS symbols of the second reference signal received by the UE, the second reference signal comprising a second PRS instance. Additionally or alternatively, the first one of the second number of RX beams may be selected based on the second measurement performed on a subset of PRS symbols comprising fewer than all PRS symbols of the second PRS instance.

According to some embodiments, the first one of the second number of RX beams may be selected based on the second measurement performed based on a plurality of PRS symbols of the one or more second PRS symbols received in the second PRS instance. In such embodiments, the second measurement may be performed on PRS signals transmitted by a plurality of base stations included in the plurality of PRS symbols. Additionally or alternatively, the second measurement may be performed based on a de-staggered PRS signal included in the plurality of PRS symbols and having no frequency discontinuity. The first measurement and the second measurement may be performed in a communication period with the base station prior to a PRS session, the first measurement may be performed based on one or more first downlink SS of the first reference signal received by the UE in the communication period, the second measurement may be performed based one or more second downlink SS of the second reference signal received by the UE in the communication period, and the location estimate may be based on one or more PRS symbols included in a third reference signal detected by the UE using either the second beam-pair a third beam-pair derived from the second beam-pair in the PRS positioning occasion. In such embodiments, the base station may be a non-serving cell for the UE. Additionally or alternatively, such embodiments may further comprise transmitting first information identifying the first TX beam, to enable the base station to use the first TX beam to perform downlink communication with the UE in the communication period, or transmit the third reference signal to the UE in the PRS session using a second TX beam, the second TX beam being Quasi Co-Located (QCLed) with the first TX beam, or both.

The first information may be transmitted to the base station via at least one of: Uplink Control Information (UCI), MAC Control Element (MAC-CE), Radio Resource Control (RRC), or transmitted to a location management function (LMF). According to some embodiments, the method may further comprise, in the PRS session, identifying the second TX beam based on an identifier of the first TX beam and Quasi co-location (QCL) codes, and forming the third beam-pair between the second TX beam and the first one of the second RX beams. Such embodiments may further comprise transmitting, to the base station, second information including a preferred time for the base station to switch to the second TX beam to transmit the third reference signal, and receiving, from the base station, a scheduled time for switching to the third beam-pair to receive the third reference signal. Additionally or alternatively, embodiments may comprise transmitting, to the base station, second information including a quality of a link formed using the second beam-pair, and receiving, from the base station, an updated modulation code scheme (MCS) for extracting signals from the first TX beam.

FIG. 11 illustrates an embodiment of a UE 105, which can be utilized in the embodiments previously described and illustrated in FIGS. 1-10. FIG. 11 is meant only to provide a generalized illustration of various components, any or all of which may be included or omitted in a particular type of device as appropriate. It can be noted that, in some instances, components illustrated by FIG. 11 can be localized to a single physical device and/or distributed among various networked devices, which may be disposed at different physical locations. The UE 105 may be configured to execute one or more functions of the methods described herein.

The UE 105 is shown comprising hardware elements that can be electrically coupled via a bus 1105 (or may otherwise be in communication, as appropriate). The hardware elements may include a processing unit(s) 1110 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 11, some embodiments may have a separate DSP 1120, depending on desired functionality. The UE 105 also may comprise one or more input devices 1170, which may comprise without limitation one or more touch screens, touch pads, microphones, buttons, dials, switches, and/or the like, which may provide for user input, for example. Output devices 1115 may comprise, without limitation, one or more displays, light emitting diode (LED)s, speakers, and/or the like.

The UE 105 may also include a wireless communication interface 1130, which may comprise without limitation a modem, a network card, an infrared communication device, a wireless communication device, and/or a chipset enabling communications using, for example, Bluetooth®, Bluetooth® Low Energy (BLE), IEEE 802.11, IEEE 802.15.4 (ZIGBEE®), Wi-Fi, a WiMAX™ device, cellular communication, and/or the like. The wireless communication interface 1130 may permit data to be communicated with a network, computer system, and/or any other electronic device as described herein. The communication can be carried out via one or more wireless communication antenna(s) 1132 that send and/or receive wireless signals 1134.

Depending on desired functionality, the wireless communication interface 1130 may comprise separate transceivers to communicate with different devices, which may be on different networks. These different data networks may comprise various network types. A wireless wide area network (WWAN), for example, may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1140, which may vary depending on the type of computing device. Such sensors may comprise, without limitation, accelerometer(s), gyroscope(s), cameras, magnetometers and/or other compasses, altimeters, microphones, proximity sensors, light sensors, and the like. In some embodiments, information acquired by the sensor(s) 1140 may be used for location determination of the UE 105.

Embodiments of the UE 105 may also include a GNSS receiver 1180 capable of receiving signals 1184 from one or more GNSS satellite vehicles (e.g., SVs 130 of FIG. 1) using an GNSS antenna 1182. Such positioning can be utilized to complement and/or incorporate the techniques described herein. The GNSS receiver 1180 can extract a position of the UE 105, using conventional techniques, from GNSS satellite vehicles (SVs) of a GNSS system, such as Global Positioning System (GPS), Galileo, Global Navigation Satellite System (GLONASS), Compass, Quasi-Zenith Satellite System (QZSS) over Japan, Indian Regional Navigational Satellite System (IRNSS) over India, Beidou over China, and/or any other satellite positioning system (SPS). Moreover, the GNSS receiver 1180 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an GNSS may include any combination of one or more global and/or regional navigation satellite systems and/or augmentation systems, and GNSS signals may include GNSS, GNSS-like, and/or other signals associated with such one or more GNSS systems.

The UE 105 may further include and/or be in communication with a memory 1160. The memory 1160 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. This memory 1160 may be used to store the images (or frames) captured by the forward-facing camera as described herein.

The memory 1160 of the UE 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as computer code and/or instructions executable by the UE 105 (and/or processing unit(s) 1110 within a UE 105). In an aspect, then, such code and/or instructions can be used to configure and/or adapt a general purpose computer (or other device) to perform one or more operations in accordance with the described methods. The memory 1160 may therefore comprise non-transitory machine-readable media having the instructions and/or computer code embedded therein/thereon. Common forms of computer-readable media include, for example, magnetic or optical media, a RAM, a PROM, EPROM, a FLASH-EPROM, any other memory chip or cartridge, a carrier wave as described hereinafter, or any other medium from which a computer can read instructions and/or code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Therefore, it is intended that claimed subject matter not be limited to the particular examples disclosed, but that such claimed subject matter may also include all aspects falling within the scope of appended claims, and equivalents thereof.

In view of this description embodiments may include different combinations of features. Implementation examples are described in the following numbered clauses:

Clause 1. A method for wireless communication at a user equipment (UE), comprising: selecting, from a first number of first receive (RX) beams having a first beam width, a first one of the first number of first RX beams to form a first beam-pair with a first transmit (TX) beam from a base station, the selection being based on a first measurement of a first reference signal received by the UE using the first beam-pair, wherein the first measurement is performed based on a first subset of orthogonal frequency division multiplexing (OFDM) symbols with which the first reference signal is received by the UE; selecting, from a second number of second RX beams having a second beam width, a first one of the second number of second RX beams to form a second beam-pair with the first TX beam, the selection being based on a second measurement of a second reference signal received by the UE using the second beam-pair, the second number of second RX beams being smaller than the first number of first RX beams, and the second beam width being narrower than the first beam width; and performing a location estimate operation of the UE based on: the first reference signal and the second reference signal, the second beam-pair, a third reference signal received by the UE using either the second beam-pair, or a third beam-pair derived from the second beam-pair, or a combination thereof.

Clause 2. The method of clause 1, wherein the selected first one of the first number of first RX beams is centered at a first direction and corresponds to a first configuration of an antenna array in which the UE is configured to detect a beam overlapping with the selected first one of the first number of first RX beams; wherein the first beam-pair is formed based on using the first configuration to detect the first TX beam; wherein the selected first one of the second number of second RX beams is centered at a second direction and corresponds to a second configuration of the antenna array in which the UE is configured to detect a beam overlapping with the selected first one of the second number of second RX beams; and where the second beam-pair is formed based on using the second configuration to detect the first TX beam.

Clause 3. The method of any of clauses 1-2 wherein the second direction comprises one of a plurality of directions of the second number of second RX beams, and the first direction and the first beam width of the selected first one of the first number of first RX beams defines the second number of directions of the second RX beams.

Clause 4. The method of any of clauses 1-3 wherein the first measurement comprises measuring a signal power of the first reference signal; and wherein the first beam-pair is selected based on the first reference signal extracted from the first TX beam detected using the first beam-pair having a highest signal power among other beam-pair combinations of the first number of first RX beams and a group of one or more TX beams comprising the first TX beam.

Clause 5. The method of any of clauses 1-3 wherein the first measurement comprises measuring a timestamp of the first reference signal; and wherein the first beam-pair is selected based on the first reference signal extracted from the first TX beam detected using the first beam-pair having an earliest timestamp among other beam-pair combinations of the first number of first RX beams and a group of one or more TX beams comprising the first TX beam.

Clause 6. The method of any of clauses 1-5 wherein the second measurement comprises measuring a timestamp of the second reference signal; and wherein the second beam-pair is selected based on the first reference signal extracted from the first TX beam detected using the first beam-pair having an earliest timestamp among other beam-pair combinations of the first number of first RX beams and a group of one or more TX beams comprising the first TX beam.

Clause 7. The method of any of clauses 1-6 wherein the first reference signal, the second reference signal, and the third reference signal comprise a position reference signal (PRS), a downlink synchronization signal (SS), or both.

Clause 8. The method of any of clauses 1-7 wherein the first measurement and the second measurement are performed in a PRS session comprising a plurality of PRS instances; wherein the first subset of OFDM symbols comprises one or more first PRS symbols of a first PRS instance; and wherein the second measurement is performed based one or more second PRS symbols of the second reference signal received by the UE, the second reference signal comprising a second PRS instance.

Clause 9. The method of clause 8 wherein the first one of the second number of second RX beams is selected based on the second measurement performed on a subset of PRS symbols comprising fewer than all PRS symbols of the second PRS instance.

Clause 10. The method of clause 8 wherein the first one of the second number of second RX beams is selected based on the second measurement performed based on a plurality of PRS symbols of the one or more second PRS symbols received in the second PRS instance.

Clause 11. The method of clause 10 wherein the second measurement is performed on PRS signals transmitted by a plurality of base stations included in the plurality of PRS symbols.

Clause 12. The method of clause 10 wherein the second measurement is performed based on a de-staggered PRS signal included in the plurality of PRS symbols and having no frequency discontinuity.

Clause 13. The method of clause 7 wherein the first measurement and the second measurement are performed in a communication period with the base station prior to a PRS session; wherein the first measurement is performed based on one or more first downlink SS of the first reference signal received by the UE in the communication period; wherein the second measurement is performed based one or more second downlink SS of the second reference signal received by the UE in the communication period; and wherein a location estimate is based on one or more PRS symbols included in a third reference signal detected by the UE using either the second beam-pair a third beam-pair derived from the second beam-pair.

Clause 14. The method of any of clauses 1-13 wherein the base station is a non-serving cell for the UE.

Clause 15. The method of any of clauses 1-14 further comprising transmitting first information identifying the first TX beam, to enable the base station to: use the first TX beam to perform downlink communication with the UE in the communication period, or transmit the third reference signal to the UE in the PRS session using a second TX beam, the second TX beam being Quasi Co-Located (QCLed) with the first TX beam, or both.

Clause 16. The method of clause 15 wherein the first information is transmitted to the base station via at least one of: Uplink Control Information (UCI), MAC Control Element (MAC-CE), Radio Resource Control (RRC), or transmitted to a location management function (LMF).

Clause 17. The method of any of clauses 15-16 further comprising in the PRS session, identifying the second TX beam based on an identifier of the first TX beam and Quasi co-location (QCL) codes; and forming the third beam-pair between the second TX beam and the first one of the second RX beams.

Clause 18. The method of clause 17 further comprising transmitting, to the base station, second information including a preferred time for the base station to switch to the second TX beam to transmit the third reference signal; and receiving, from the base station, a scheduled time for switching to the third beam-pair to receive the third reference signal.

Clause 19. The method of clause 15 further comprising transmitting, to the base station, second information including a quality of a link formed using the second beam-pair; and receiving, from the base station, an updated modulation code scheme (MCS) for extracting signals from the first TX beam.

Clause 20. A user equipment (UE), the UE comprising: a transceiver; a memory; and one or more processors communicatively coupled with the transceiver and the memory, wherein the one or more processors are configured to: select, from a first number of first receive (RX) beams having a first beam width, a first one of the first number of first RX beams to form a first beam-pair with a first transmit (TX) beam from a base station, the selection being based on a first measurement of a first reference signal received by the UE using the first beam-pair, wherein the first measurement is performed based on a first subset of orthogonal frequency division multiplexing (OFDM) symbols with which the first reference signal is received by the UE; select, from a second number of second RX beams having a second beam width, a first one of the second number of second RX beams to form a second beam-pair with the first TX beam, the selection being based on a second measurement of a second reference signal received by the UE using the second beam-pair, the second number of second RX beams being smaller than the first number of first RX beams, and the second beam width being narrower than the first beam width; and perform a location estimate operation of the UE based on: the first reference signal and the second reference signal, the second beam-pair, a third reference signal received by the UE using either the second beam-pair, or a third beam-pair derived from the second beam-pair, or a combination thereof.

Clause 21. The UE of clause 20, wherein the selected first one of the first number of first RX beams is centered at a first direction and corresponds to a first configuration of an antenna array of the transceiver in which the UE is configured to detect a beam overlapping with the selected first one of the first number of first RX beams; wherein the one or more processors are configured to form the first beam-pair based on using the first configuration to detect the first TX beam; wherein the selected first one of the second number of second RX beams is centered at a second direction and corresponds to a second configuration of the antenna array of the transceiver in which the UE is configured to detect a beam overlapping with the selected first one of the second number of second RX beams; and where the one or more processors are configured to form the second beam-pair based on using the second configuration to detect the first TX beam.

Clause 22. The UE of any of clauses 20-21 wherein the second direction comprises one of a plurality of directions of the second number of second RX beams, and the first direction and the first beam width of the selected first one of the first number of first RX beams defines the second number of directions of the second RX beams.

Clause 23. The UE of any of clauses 20-22 wherein, to perform the first measurement, the one or more processors are configured to measure a signal power of the first reference signal; and wherein the one or more processors are configured to select the first beam-pair based on the first reference signal extracted from the first TX beam detected using the first beam-pair having a highest signal power among other beam-pair combinations of the first number of first RX beams and a group of one or more TX beams comprising the first TX beam.

Clause 24. The UE of any of clauses 20-22 wherein, to perform the first measurement, the one or more processors are configured to measure a timestamp of the first reference signal; and wherein the one or more processors are configured to select the first beam-pair based on the first reference signal extracted from the first TX beam detected using the first beam-pair having an earliest timestamp among other beam-pair combinations of the first number of first RX beams and a group of one or more TX beams comprising the first TX beam.

Clause 25. The UE of any of clauses 20-24 wherein, to perform the second measurement, the one or more processors are configured to measure a timestamp of the second reference signal; and wherein the one or more processors are configured to select the second beam-pair based on the first reference signal extracted from the first TX beam detected using the first beam-pair having an earliest timestamp among other beam-pair combinations of the first number of first RX beams and a group of one or more TX beams comprising the first TX beam.

Clause 26. The UE of any of clauses 20-25 wherein the first reference signal, the second reference signal, and the third reference signal comprise a position reference signal (PRS), a downlink synchronization signal (SS), or both.

Clause 27. The UE of any of clauses 20-26 wherein the one or more processors are configured to perform the first measurement and the second measurement in a PRS session comprising a plurality of PRS instances; wherein the subset of OFDM symbols with which the first reference signal is configured to be received by the UE comprises one or more first PRS symbols of a first PRS instance; and wherein the one or more processors are configured to perform the second measurement based one or more second PRS symbols of the second reference signal received by the UE, the second reference signal comprising a second PRS instance.

Clause 28. The UE of clause 27 wherein the one or more processors are configured to select first one of the second number of second RX beams based on the second measurement performed on a subset of PRS symbols comprising fewer than all PRS symbols of the second PRS instance.

Clause 29. The UE of clause 27 wherein the one or more processors are configured to select the first one of the second number of second RX beams based on the second measurement performed based on a plurality of PRS symbols of the one or more second PRS symbols received in the second PRS instance.

Clause 30. The UE of clause 29 wherein, to perform the second measurement, the one or more processors are configured to perform a measurement of PRS signals transmitted by a plurality of base stations included in the plurality of PRS symbols.

Clause 31. The UE of clause 29 wherein, to perform the second measurement, the one or more processors are configured to perform a measurement of a de-staggered PRS signal included in the plurality of PRS symbols and having no frequency discontinuity.

Clause 32. The UE of clause 26 wherein the one or more processors are configured to perform the first measurement and the second measurement in a communication period with the base station prior to a PRS session; wherein the one or more processors are configured to perform the first measurement based on one or more first downlink SS of the first reference signal received by the UE in the communication period; wherein the one or more processors are configured to perform the second measurement based one or more second downlink SS of the second reference signal received by the UE in the communication period; and wherein the one or more processors are configured to base a location estimate on one or more PRS symbols included in a third reference signal detected by the UE using either the second beam-pair a third beam-pair derived from the second beam-pair.

Clause 33. The UE of any of clauses 20-32 wherein the one or more processors are further configured to: transmit, via the transceiver, first information identifying the first TX beam, to enable the base station to: use the first TX beam to perform downlink communication with the UE in the communication period, or transmit the third reference signal to the UE in the PRS session using a second TX beam, the second TX beam being Quasi Co-Located (QCLed) with the first TX beam, or both.

Clause 34. The UE of clause 33 wherein the one or more processors are further configured to transmit the first information to the base station via at least one of: Uplink Control Information (UCI), MAC Control Element (MAC-CE), Radio Resource Control (RRC), or transmitted to a location management function (LMF).

Clause 35. The UE of any of clauses 33-34 wherein the one or more processors are further configured to: in the PRS session, identify the second TX beam based on an identifier of the first TX beam and Quasi co-location (QCL) codes; and form the third beam-pair between the second TX beam and the first one of the second RX beams.

Clause 36. The UE of clause 35 wherein the one or more processors are further configured to: transmit, to the base station via the transceiver, second information including a preferred time for the base station to switch to the second TX beam to transmit the third reference signal; and receive, from the base station via the transceiver, a scheduled time for switching to the third beam-pair to receive the third reference signal.

Clause 37. The UE of clause 36 wherein the one or more processors are further configured to: transmit, to the base station via the transceiver, second information including a quality of a link formed using the second beam-pair; and receive, from the base station via the transceiver, an updated modulation code scheme (MCS) for extracting signals from the first TX beam.

Clause 38. An apparatus for wireless communication at a user equipment (UE), the apparatus comprising: means for selecting, from a first number of first receive (RX) beams having a first beam width, a first one of the first number of first RX beams to form a first beam-pair with a first transmit (TX) beam from a base station, the selection being based on a first measurement of a first reference signal received by the UE using the first beam-pair, wherein the first measurement is performed based on a first subset of orthogonal frequency division multiplexing (OFDM) symbols with which the first reference signal is received by the UE; means for selecting, from a second number of second RX beams having a second beam width, a first one of the second number of second RX beams to form a second beam-pair with the first TX beam, the selection being based on a second measurement of a second reference signal received by the UE using the second beam-pair, the second number of second RX beams being smaller than the first number of first RX beams, and the second beam width being narrower than the first beam width; and means for performing a location estimate operation of the UE based on: the first reference signal and the second reference signal, the second beam-pair, a third reference signal received by the UE using either the second beam-pair, or a third beam-pair derived from the second beam-pair, or a combination thereof.

Clause 39. The apparatus of clause 38, wherein the means for selecting the first one of the first number of first RX beams comprises means for selecting the first one of the first number of first RX beams centered at a first direction and corresponding to a first configuration of an antenna array in which the apparatus is configured to detect a beam overlapping with the selected first one of the first number of first RX beams; wherein the apparatus further comprises means for forming the first beam-pair based on using the first configuration to detect the first TX beam; wherein the means for selecting the first one of the second number of second RX beams comprises means for selecting the first one of the second number of second RX beams centered at a second direction and corresponding to a second configuration of the antenna array in which the apparatus is configured to detect a beam overlapping with the selected first one of the second number of second RX beams; and wherein the apparatus further comprises means for forming the second beam-pair based on using the second configuration to detect the first TX beam.

Clause 40. A non-transitory computer-readable medium storing instructions for wireless communication at a user equipment (UE), the instructions comprising code for: selecting, from a first number of first receive (RX) beams having a first beam width, a first one of the first number of first RX beams to form a first beam-pair with a first transmit (TX) beam from a base station, the selection being based on a first measurement of a first reference signal received by the UE using the first beam-pair, wherein the first measurement is performed based on a first subset of orthogonal frequency division multiplexing (OFDM) symbols with which the first reference signal is received by the UE; selecting, from a second number of second RX beams having a second beam width, a first one of the second number of second RX beams to form a second beam-pair with the first TX beam, the selection being based on a second measurement of a second reference signal received by the UE using the second beam-pair, the second number of second RX beams being smaller than the first number of first RX beams, and the second beam width being narrower than the first beam width; and performing a location estimate operation of the UE based on: the first reference signal and the second reference signal, the second beam-pair, a third reference signal received by the UE using either the second beam-pair, or a third beam-pair derived from the second beam-pair, or a combination thereof.

What is claimed is:

1. A method for wireless communication at a user equipment (UE), comprising:

selecting, from a first number of first receive (RX) beams having a first beam width, a first one of the first number of first RX beams to form a first beam-pair with a first transmit (TX) beam from a base station, the selection being based on a first measurement of a first reference signal received by the UE using the first beam-pair, wherein the first measurement is performed based on a first subset of orthogonal frequency division multiplexing (OFDM) symbols with which the first reference signal is received by the UE;

selecting, from a second number of second RX beams having a second beam width, a first one of the second number of second RX beams to form a second beam-pair with the first TX beam, the selection being based on a second measurement of a second reference signal received by the UE using the second beam-pair, and the second beam width being narrower than the first beam width, wherein:

the selected first one of the first number of first RX beams is centered at a first direction and corresponds to a first configuration of an antenna array in which the UE is configured to detect a beam overlapping with the selected first one of the first number of first RX beams, the first beam-pair is formed based on using the first configuration to detect the first TX beam, the selected first one of the second number of second RX beams is centered at a second direction and corresponds to a second configuration of the antenna array in which the UE is configured to detect a beam overlapping with the selected first one of the second number of second RX beams, and the second beam-pair is formed based on using the second configuration to detect the first TX beam; and performing a location estimate operation of the UE based on: the first reference signal and the second reference signal, the second beam-pair, a third reference signal received by the UE using either the second beam-pair, or a third beam-pair derived from the second beam-pair, or a combination thereof.

2. The method of claim 1, wherein the second direction comprises one of a plurality of directions of the second number of second RX beams, and the first direction and the first beam width of the selected first one of the first number of first RX beams defines the second number of directions of the second RX beams.

3. The method of claim 1, wherein the first measurement comprises measuring a signal power of the first reference signal; and
wherein the first beam-pair is selected based on the first reference signal extracted from the first TX beam detected using the first beam-pair having a highest signal power among other beam-pair combinations of the first number of first RX beams and a group of one or more TX beams comprising the first TX beam.

4. The method of claim 1, wherein the first measurement comprises measuring a timestamp of the first reference signal; and
wherein the first beam-pair is selected based on the first reference signal extracted from the first TX beam detected using the first beam-pair having an earliest timestamp among other beam-pair combinations of the first number of first RX beams and a group of one or more TX beams comprising the first TX beam.

5. The method of claim 1, wherein the second measurement comprises measuring a timestamp of the second reference signal; and
wherein the second beam-pair is selected based on the first reference signal extracted from the first TX beam detected using the first beam-pair having an earliest timestamp among other beam-pair combinations of the first number of first RX beams and a group of one or more TX beams comprising the first TX beam.

6. The method of claim 1, wherein the first reference signal, the second reference signal, and the third reference signal comprise a position reference signal (PRS), a downlink synchronization signal (SS), or both.

7. The method of claim 6, wherein the first measurement and the second measurement are performed in a PRS session comprising a plurality of PRS instances;
wherein the first subset of OFDM symbols comprises one or more first PRS symbols of a first PRS instance; and
wherein the second measurement is performed based on one or more second PRS symbols of the second reference signal received by the UE, the second reference signal comprising a second PRS instance.

8. The method of claim 7, wherein the first one of the second number of second RX beams is selected based on the second measurement performed on a subset of PRS symbols comprising fewer than all PRS symbols of the second PRS instance.

9. The method of claim 7, wherein the first one of the second number of second RX beams is selected based on the second measurement performed based on a plurality of PRS symbols of the one or more second PRS symbols received in the second PRS instance.

10. The method of claim 9, wherein the second measurement is performed on PRS signals transmitted by a plurality of base stations included in the plurality of PRS symbols.

11. The method of claim 9, wherein the second measurement is performed based on a de-staggered PRS signal included in the plurality of PRS symbols and having no frequency discontinuity.

12. The method of claim 6, wherein the first measurement and the second measurement are performed in a communication period with the base station prior to a PRS session;
wherein the first measurement is performed based on one or more first downlink SS of the first reference signal received by the UE in the communication period;
wherein the second measurement is performed based on one or more second downlink SS of the second reference signal received by the UE in the communication period; and
wherein a location estimate is based on one or more PRS symbols included in the third reference signal detected by the UE using either the second beam-pair or a third beam-pair derived from the second beam-pair.

13. The method of claim 12, wherein the base station is a non-serving cell for the UE.

14. The method of claim 12, further comprising:
transmitting first information identifying the first TX beam, to enable the base station to:
use the first TX beam to perform downlink communication with the UE in the communication period, or
transmit the third reference signal to the UE in the PRS session using a second TX beam, the second TX beam being Quasi Co-Located (QCLed) with the first TX beam, or both.

15. The method of claim 14, wherein the first information is transmitted to the base station via at least one of: Uplink Control Information (UCI), MAC Control Element (MAC-CE), Radio Resource Control (RRC), or transmitted to a location management function (LMF).

16. The method of claim 14, further comprising:
in the PRS session, identifying the second TX beam based on an identifier of the first TX beam and Quasi co-location (QCL) codes; and
forming the third beam-pair between the second TX beam and the first one of the second RX beams.

17. The method of claim 16, further comprising:
transmitting, to the base station, second information including a preferred time for the base station to switch to the second TX beam to transmit the third reference signal; and
receiving, from the base station, a scheduled time for switching to the third beam-pair to receive the third reference signal.

18. The method of claim 14, further comprising:
transmitting, to the base station, second information including a quality of a link formed using the second beam-pair; and
receiving, from the base station, an updated modulation code scheme (MCS) for extracting signals from the first TX beam.

19. A user equipment (UE), the UE comprising:
a transceiver;
a memory; and
one or more processors communicatively coupled with the transceiver and the memory, wherein the one or more processors are configured to:
select, from a first number of first receive (RX) beams having a first beam width, a first one of the first number of first RX beams to form a first beam-pair with a first transmit (TX) beam from a base station, the selection being based on a first measurement of a first reference signal received by the UE using the first beam-pair, wherein the first measurement is performed based on a first subset of orthogonal frequency division multiplexing (OFDM) symbols with which the first reference signal is received by the UE;

select, from a second number of second RX beams having a second beam width, a first one of the second number of second RX beams to form a second beam-pair with the first TX beam, the selection being based on a second measurement of a second reference signal received by the UE using the second beam-pair, and the second beam width being narrower than the first beam width, wherein:

the selected first one of the first number of first RX beams is centered at a first direction and corresponds to a first configuration of an antenna array of the transceiver in which the UE is configured to detect a beam overlapping with the selected first one of the first number of first RX beams, the one or more processors are configured to form the first beam-pair based on using the first configuration to detect the first TX beam, the selected first one of the second number of second RX beams is centered at a second direction and corresponds to a second configuration of the antenna array of the transceiver in which the UE is configured to detect a beam overlapping with the selected first one of the second number of second RX beams, and the one or more processors are configured to form the second beam-pair based on using the second configuration to detect the first TX beam; and perform a location estimate operation of the UE based on: the first reference signal and the second reference signal, the second beam-pair, a third reference signal received by the UE using either the second beam-pair, or a third beam-pair derived from the second beam-pair, or a combination thereof.

20. The UE of claim 19, wherein the second direction comprises one of a plurality of directions of the second number of second RX beams, and the first direction and the first beam width of the selected first one of the first number of first RX beams defines the second number of directions of the second RX beams.

21. The UE of claim 19, wherein, to perform the first measurement, the one or more processors are configured to measure a signal power of the first reference signal; and wherein the one or more processors are configured to select the first beam-pair based on the first reference signal extracted from the first TX beam detected using the first beam-pair having a highest signal power among other beam-pair combinations of the first number of first RX beams and a group of one or more TX beams comprising the first TX beam.

22. The UE of claim 19, wherein, to perform the first measurement, the one or more processors are configured to measure a timestamp of the first reference signal; and wherein the one or more processors are configured to select the first beam-pair based on the first reference signal extracted from the first TX beam detected using the first beam-pair having an earliest timestamp among other beam-pair combinations of the first number of first RX beams and a group of one or more TX beams comprising the first TX beam.

23. The UE of claim 19, wherein, to perform the second measurement, the one or more processors are configured to measure a timestamp of the second reference signal; and wherein the one or more processors are configured to select the second beam-pair based on the first reference signal extracted from the first TX beam detected using the first beam-pair having an earliest timestamp among other beam-pair combinations of the first number of first RX beams and a group of one or more TX beams comprising the first TX beam.

24. The UE of claim 19, wherein the first reference signal, the second reference signal, and the third reference signal comprise a position reference signal (PRS), a downlink synchronization signal (SS), or both.

25. The UE of claim 24, wherein the one or more processors are configured to perform the first measurement and the second measurement in a PRS session comprising a plurality of PRS instances;

wherein the subset of OFDM symbols with which the first reference signal is configured to be received by the UE comprises one or more first PRS symbols of a first PRS instance; and wherein the one or more processors are configured to perform the second measurement based on one or more second PRS symbols of the second reference signal received by the UE, the second reference signal comprising a second PRS instance.

26. The UE of claim 25, wherein the one or more processors are configured to select first one of the second number of second RX beams based on the second measurement performed on a subset of PRS symbols comprising fewer than all PRS symbols of the second PRS instance.

27. The UE of claim 25, wherein the one or more processors are configured to select the first one of the second number of second RX beams based on the second measurement performed based on a plurality of PRS symbols of the one or more second PRS symbols received in the second PRS instance.

28. The UE of claim 27, wherein, to perform the second measurement, the one or more processors are configured to perform a measurement of PRS signals transmitted by a plurality of base stations included in the plurality of PRS symbols.

29. The UE of claim 27, wherein, to perform the second measurement, the one or more processors are configured to perform a measurement of a de-staggered PRS signal included in the plurality of PRS symbols and having no frequency discontinuity.

30. The UE of claim 24, wherein the one or more processors are configured to perform the first measurement and the second measurement in a communication period with the base station prior to a PRS session;

wherein the one or more processors are configured to perform the first measurement based on one or more first downlink SS of the first reference signal received by the UE in the communication period;

wherein the one or more processors are configured to perform the second measurement based on one or more second downlink SS of the second reference signal received by the UE in the communication period; and wherein the one or more processors are configured to base a location estimate on one or more PRS symbols included in the third reference signal detected by the UE using either the second beam-pair or a third beam-pair derived from the second beam-pair.

31. The UE of claim 30, wherein the one or more processors are further configured to:

transmit, via the transceiver, first information identifying the first TX beam, to enable the base station to:

use the first TX beam to perform downlink communication with the UE in the communication period, or transmit the third reference signal to the UE in the PRS session using a second TX beam, the second TX beam being Quasi Co-Located (QCLed) with the first TX beam, or both.

32. The UE of claim 31, wherein the one or more processors are further configured to transmit the first information to the base station via at least one of: Uplink Control Information (UCI), MAC Control Element (MAC-CE), Radio Resource Control (RRC), or transmitted to a location management function (LMF).

33. The UE of claim 31, wherein the one or more processors are further configured to:
  in the PRS session, identify the second TX beam based on an identifier of the first TX beam and Quasi co-location (QCL) codes; and
  form the third beam-pair between the second TX beam and the first one of the second RX beams.

34. The UE of claim 33, wherein the one or more processors are further configured to:
  transmit, to the base station via the transceiver, second information including a preferred time for the base station to switch to the second TX beam to transmit the third reference signal; and
  receive, from the base station via the transceiver, a scheduled time for switching to the third beam-pair to receive the third reference signal.

35. The UE of claim 31, wherein the one or more processors are further configured to:
  transmit, to the base station via the transceiver, second information including a quality of a link formed using the second beam-pair; and
  receive, from the base station via the transceiver, an updated modulation code scheme (MCS) for extracting signals from the first TX beam.

36. An apparatus for wireless communication at a user equipment (UE), the apparatus comprising:
  means for selecting, from a first number of first receive (RX) beams having a first beam width, a first one of the first number of first RX beams to form a first beam-pair with a first transmit (TX) beam from a base station, the selection being based on a first measurement of a first reference signal received by the UE using the first beam-pair, wherein the first measurement is performed based on a first subset of orthogonal frequency division multiplexing (OFDM) symbols with which the first reference signal is received by the UE;
  means for selecting, from a second number of second RX beams having a second beam width, a first one of the second number of second RX beams to form a second beam-pair with the first TX beam, the selection being based on a second measurement of a second reference signal received by the UE using the second beam-pair, and the second beam width being narrower than the first beam width, wherein:
    the means for selecting the first one of the first number of first RX beams comprises means for selecting the first one of the first number of first RX beams centered at a first direction and corresponding to a first configuration of an antenna array in which the apparatus is configured to detect a beam overlapping with the selected first one of the first number of first RX beams,
    the apparatus further comprises means for forming the first beam-pair based on using the first configuration to detect the first TX beam,
    the means for selecting the first one of the second number of second RX beams comprises means for selecting the first one of the second number of second RX beams centered at a second direction and corresponding to a second configuration of the antenna array in which the apparatus is configured to detect a beam overlapping with the selected first one of the second number of second RX beams, and
  wherein the apparatus further comprises means for forming the second beam-pair based on using the second configuration to detect the first TX beam; and
  means for performing a location estimate operation of the UE based on: the first reference signal and the second reference signal, the second beam-pair, a third reference signal received by the UE using either the second beam-pair, or a third beam-pair derived from the second beam-pair, or a combination thereof.

37. A non-transitory computer-readable medium storing instructions for wireless communication at a user equipment (UE), the instructions comprising code for:
  selecting, from a first number of first receive (RX) beams having a first beam width, a first one of the first number of first RX beams to form a first beam-pair with a first transmit (TX) beam from a base station, the selection being based on a first measurement of a first reference signal received by the UE using the first beam-pair, wherein the first measurement is performed based on a first subset of orthogonal frequency division multiplexing (OFDM) symbols with which the first reference signal is received by the UE;
  selecting, from a second number of second RX beams having a second beam width, a first one of the second number of second RX beams to form a second beam-pair with the first TX beam, the selection being based on a second measurement of a second reference signal received by the UE using the second beam-pair, and the second beam width being narrower than the first beam width, wherein:
    the selected first one of the first number of first RX beams is centered at a first direction and corresponds to a first configuration of an antenna array in which the UE is configured to detect a beam overlapping with the selected first one of the first number of first RX beams,
    the first beam-pair is formed based on using the first configuration to detect the first TX beam,
    the selected first one of the second number of second RX beams is centered at a second direction and corresponds to a second configuration of the antenna array in which the UE is configured to detect a beam overlapping with the selected first one of the second number of second RX beams, and
    the second beam-pair is formed based on using the second configuration to detect the first TX beam; and
  performing a location estimate operation of the UE based on: the first reference signal and the second reference signal, the second beam-pair, a third reference signal received by the UE using either the second beam-pair, or a third beam-pair derived from the second beam-pair, or a combination thereof.

* * * * *